(12) United States Patent
Nakano et al.

(10) Patent No.: US 7,425,175 B2
(45) Date of Patent: Sep. 16, 2008

(54) MATCH GAME PROGRAM

(75) Inventors: Takao Nakano, Kyoto (JP); Kazuki Yoshihara, Kyoto (JP)

(73) Assignee: Nintendo Co., Ltd., Kyoto-shi (JP)

( * ) Notice: Subject to any disclaimer, the term of this patent is extended or adjusted under 35 U.S.C. 154(b) by 363 days.

(21) Appl. No.: 11/377,216

(22) Filed: Mar. 17, 2006

(65) Prior Publication Data

US 2006/0258415 A1 Nov. 16, 2006

(30) Foreign Application Priority Data

May 16, 2005 (JP) ............................. 2005-142826

(51) Int. Cl.
- A63F 9/24 (2006.01)
- A63F 13/00 (2006.01)
- G06F 17/00 (2006.01)
- G06F 19/00 (2006.01)

(52) U.S. Cl. .................................. 463/11; 463/7; 463/9

(58) Field of Classification Search .................... 463/7, 463/9

See application file for complete search history.

(56) References Cited

U.S. PATENT DOCUMENTS

| | | | | |
|---|---|---|---|---|
| 5,265,888 A | * | 11/1993 | Yamamoto et al. | 463/10 |
| RE36,675 E | * | 4/2000 | Yamamoto et al. | 463/10 |
| 6,352,475 B1 | * | 3/2002 | Mraovic | 463/9 |
| 6,458,032 B1 | * | 10/2002 | Yamagami | 463/9 |
| 6,579,177 B2 | * | 6/2003 | Mraovic | 463/9 |

OTHER PUBLICATIONS

Alexey Pajitnov, "Tetris," 1985, http://en.wikipedia.org/wiki/Tetris.*
"List of Tetris variants," article created Apr. 19, 2005, http://en.wikipedia.org/wiki/List_of_Tetris_variants.*
"Tetris DS" manual, Mar. 20, 2006, Nintendo, http://www.nintendo.com/comsumer/gameslist/manualsDS_Tetris_DS.pdf.*
Game Boy Super Hint Book: Tetris, issued by Work House on Oct. 20, 1989, 3 pages.

* cited by examiner

Primary Examiner—Xuan M. Thai
Assistant Examiner—Kevin Y Kim
(74) Attorney, Agent, or Firm—Nixon & Vanderhye P.C.

(57) ABSTRACT

A game apparatus includes a CPU core. The CPU core firstly displays a field defined by a first side and a second side and shows a fixed block in the field. Then, the CPU core executes a player game process using the fixed block in response to a player's input operation, and displaces the fixed block in a direction of moving from the first side toward the second side based on result of the execution. The CPU core also executes an opponent game process and displaces the fixed block in a direction of moving from the second side toward the first side based on result of the execution. In addition, the CPU core determines whether the fixed block has reached the first section or not, and if result of the determination is affirmative, it executes a player defeat process. Moreover, the CPU core determines whether the fixed block has reached the second section or not, and if result of the determination is affirmative, it executes a player victory process.

7 Claims, 20 Drawing Sheets

(A)

(B)

(A)

(B)

(A)

(B)

(A)

(B)

US 7,425,175 B2

MATCH GAME PROGRAM

CROSS REFERENCE OF RELATED APPLICATION

The disclosure of Japanese Patent Application No. 2005-142826 is incorporated herein by reference.

BACKGROUND OF THE INVENTION

1. Field of the invention

The present invention relates to a match game program. More specifically, the present invention relates to a match game program for playing a match in a game using a fixed block.

2. Description of the related art

There is known a conventional match game program of this kind disclosed in a non-patent document "GAME BOY Super Hint Book: Tetris" (issued by Work House on Oct. 20, 1989). This related art allows a player and his/her opponent to individually play a game using fixed blocks in different game fields. The fixed block in the opponent's game field is pushed up according to the player's game result, and the fixed block in the player's game field is pushed up according to the opponent's game result. The player or the opponent comes off the winner when he/she has pushed the other's fixed block up to an upper end of the field.

In the related art, however, the player and the opponent individually play their games in different game fields, which cannot necessarily offer a sufficient sense of urgency.

SUMMARY OF THE INVENTION

Therefore, it is a primary object of the present invention to provide a novel match game program.

It is another object of the present invention to provide a match game program that enhances a sense of urgency.

A program according to the present invention of claim 1 allows a processor (42: a reference numeral corresponding to the one in the embodiment. The same applies to the following reference numerals.) of a computer (10) having an acceptance means (18) for accepting an input operation to perform a field display step (S1), a fixed block display step (S3), a player process step (S5), an opponent process step (S7), a first reach determination step (S9), a second reach determination step (S11), a defeat process step (S13) and a victory process step (S15).

In the field display step, a game field (GF) defined by a first side (P) and a second side (Q) individually parallel to a predetermined axis (A) is displayed. In the fixed block display step, a fixed block (SB1, SB2, . . . ) composed of one or more unit block pieces is displayed in the game field.

In the player process step, in response to the input operation accepted by the acceptance means, a player game process is carried out using the fixed block, and the fixed block is displaced in a first direction of moving from the first side toward the second side based on result of the player game process. In the opponent process step, an opponent game process is executed using the fixed block, and the fixed block is displaced in a second direction of moving from the second side toward the first side based on result of the opponent game process.

In the first reach determination step, it is determined whether or not the fixed block has reached the first side. In the defeat process step, a player defeat process is carried out when result of determination in the first reach determination step is affirmative. In the second reach determination step, it is determined whether or not the fixed block has reached the second side. In the victory process step, a player victory process is executed when result of determination in the second reach determination step is affirmative.

In the present invention of claim 1, the player and the opponent perform their individual games using the fixed blocks in one game field. The fixed block is displaced in the first direction based on the result of the player game process, and displaced in the second direction based on the result of the opponent game process. The player wins the game when the fixed block has reached the second side, while the opponent wins the game when the fixed block has reached the first side. Thus, the match will be provided with an enhanced sense of urgency by pushing the fixed block each other.

A program according to the present invention of claim 2 depends on claim 1. The computer has further a receive means (64) for receiving a signal. In the opponent process step, the opponent game process is carried out on the basis of the signal received by the receive means.

According to the present invention of claim 2, the player can play a match game against the other player.

A program according to the present invention of claim 3 depends on claim 1. The player process step includes a first moving block display step (S23, S25), a first control step (S29), a first adhesion determination step (S31), a first alignment determination step (S35), a first erase step (S37) and a first displacement step (S41). The opponent process step includes a second moving block display step (S79, S81), a second control step (S83), a second adhesion determination step (S85), a second alignment determination step (S89), a second erase step (S91) and a second displacement step (S95). The first side and the second side are individually parallel to a predetermined axis.

In the first moving block display step, a first moving block (MBP) is displayed in the game field. The first moving block is composed of one or more unit block pieces and moved in the first direction. In the first control step, in response to the input operation accepted by the acceptance means, the first moving block is subjected to a motion control process including a process of movement along the axis. In the first adhesion determination step, it is determined whether or not the first moving block has adhered to the fixed block.

In the first alignment determination step, when result of the determination in the first adhesion determination step is affirmative, it is determined whether or not unit block pieces of a new fixed block composed of the fixed block and the first moving block are aligned along the axis with no space between them. In the first erase step, when result of the determination in the first alignment determination step is affirmative, a line of the unit block pieces is erased. In the first displacement step, a fixed block derived from the erase in the first erase step is displaced by an amount in accordance with the number of block line(s) erased in the first erase step.

In the second moving block display step, a second moving block (MBQ) is displaced in the game field. The second moving block is composed of one or more unit block pieces and moved in the second direction. In the second control step, the second moving block is subjected to the motion control process. In the second adhesion determination step, it is determined whether or not the second moving block has adhered to the fixed block.

In the second alignment determination step, when result of the determination in the second adhesion determination step is affirmative, it is determined whether or not unit block pieces of a new fixed block composed of the fixed block and the second moving block are aligned along the axis with no space between them. In the second erase step, when result of the determination in the second alignment determination step is affirmative, a line of the unit block pieces is erased. In the second displacement step, a fixed block derived from the erase in the second erase step is displaced by an amount in accordance with the number of block line(s) erased in the second erase step.

In the present invention of claim 3, the player controls the first moving block that moves in the first direction from the first side toward the second side, while the opponent controls the second moving block that moves in the second direction from the second side toward the first side. Each of the fixed block, the first moving block and the second moving block is composed of one or more unit block pieces.

When the first moving block has adhered to the fixed block under control of the player and thus the unit block pieces of a new fixed block have aligned along the axis with no space between them, a block line of the unit block pieces is erased and a fixed block derived from the erase is displaced in the first direction by an amount in accordance with the number of erased block line(s).

When the second moving block has adhered to the fixed block under control of the opponent and thus the unit block pieces of a new fixed block have aligned along the axis with no space between them, a block line of the unit block pieces is erased and a fixed block derived from the erase is displaced in the second direction by an amount in accordance with the number of erased block line(s).

The game field is divided by the fixed block into the player's field and the opponent's field. Either of them, the player and the opponent, can widen his/her field and narrow the other's field by pushing the fixed block into the other's field, which accelerates the progress of the game. In addition, the game can be advanced in a diversified manner by changing the amount of displacement of the fixed block according to the number of erased line(s). This further heightens a sense of urgency in the match game.

A program according to claim 4 depends on claim 3. The first moving block and the second moving block have their individual asymmetric shapes. The motion control process further includes a rotation process.

According to the present invention of claim 4, it is possible to impart complicated motion to the moving blocks.

A program according to the present invention of claim 5 depends on claim 3. The player process step further includes a third reach determination step (S51) and a third erase step (S53). The opponent process step further includes a fourth reach determination step (S105) and a fourth erase step (S107).

In the third reach determination step, it is determined whether or not the first moving block has reached the second side. In the third erase step, when result of the determination is affirmative, the first moving block is erased. In the fourth reach determination step, it is determined whether or not the second moving block has reached the first side. In the fourth erase step, when result of the determination is affirmative, the second moving block is erased.

According to the present invention of claim 5, a player and his/her opponent can keep their game fields wide by erasing the first moving block that has reached the second side or the second moving block that has reached the first side.

A program according to the present invention of claim 6 depends on claim 5. The player process step further includes a first float step (S45), and the opponent process step further includes a second float step (S99).

In the first float step, a floating block (FB1, FB2, . . . ) derived from the erase in the first erase step is moved in the first direction. In the second float step, a floating block derived from the erase in the second erase step is moved in the second direction.

In the third reach determination step, it is determined whether or not a floating block has reached the second side. In the third erase step, when result of the determination is affirmative, the floating block is further erased. In the fourth reach determination step, it is further determined whether or not a floating block has reached the first side. In the fourth erase step, when result of the determination is affirmative, the floating block is further erased.

According to the present invention of claim 6, a player and his/her opponent can keep their game fields wide by erasing a floating block that has reached the first side or the second side.

The present invention of claim 7 provides a heightened sense of urgency in the match game, as with the present invention of claim 1.

According to the present invention, it is possible to enhance a sense of urgency.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 (B) is an illustrative view showing another example of game screen applied to FIG. 1 embodiment;

FIG. 11 (B) is an illustrative view showing further another example of game screen applied to FIG. 1 embodiment;

FIG. 12 (B) is an illustrative view showing still another example of game screen applied to FIG. 1 embodiment;

FIG. 13 (B) is an illustrative view showing another example of game screen applied to FIG. 1 embodiment;

DETAILED DESCRIPTION OF THE PREFERRED EMBODIMENTS

Figure 1:
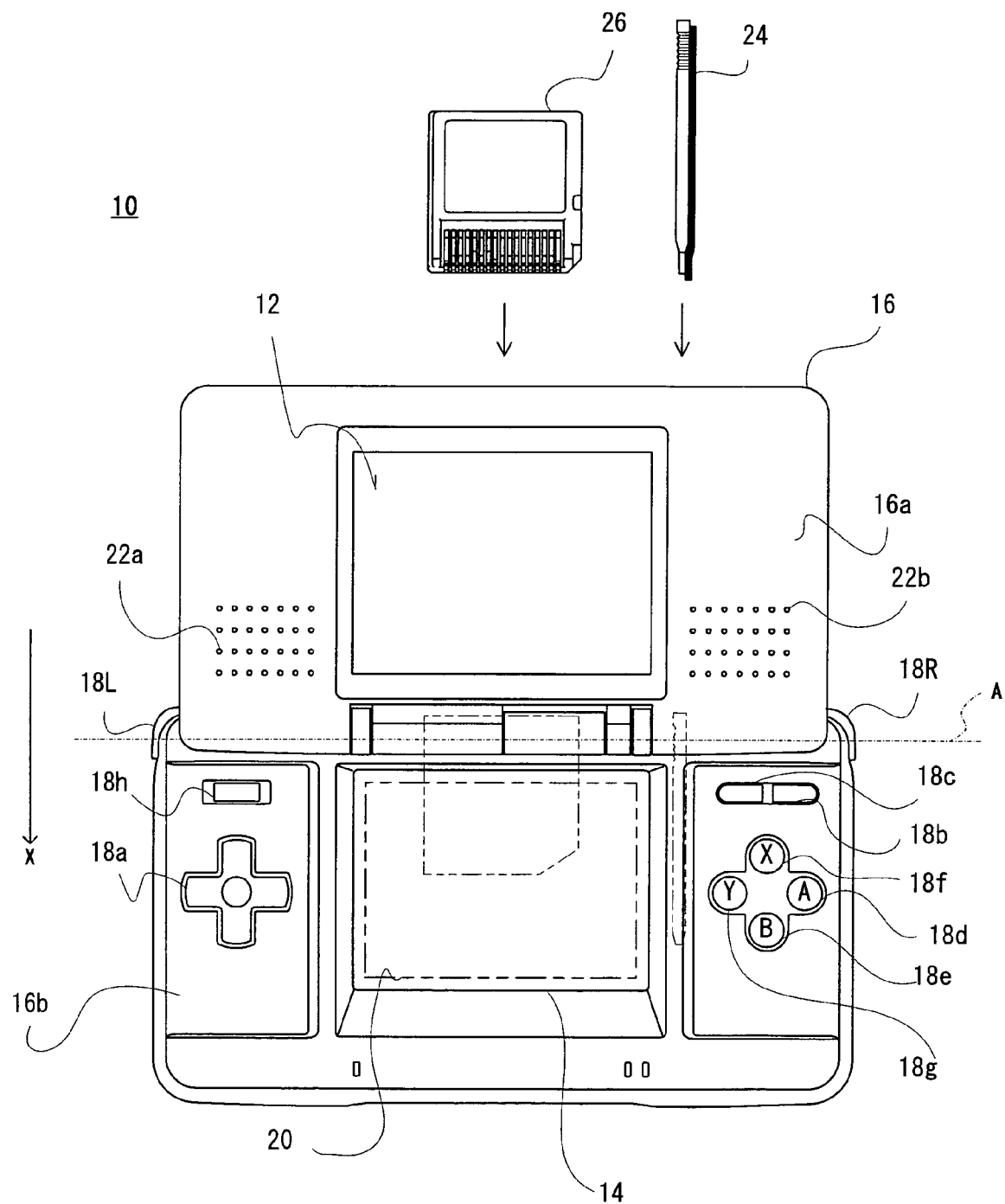
FIG. 1 is an illustrative view showing an outer appearance of one embodiment of the present invention.

Referring to FIG. 1, a game apparatus 10 of one embodiment of the present invention includes a first liquid crystal display (LCD) 12 and a second LCD 14. The LCD 12 and the LCD 14 are stored in a housing 16 so as to be arranged in predetermined positions. In this embodiment, the housing 16 is formed by an upper housing 16a and a lower housing 16b. The LCD 12 is stored in the upper housing 16a while the LCD 14 is stored in the lower housing 16b. Accordingly, the LCD 12 and the LCD 14 are closely arranged so as to be longitudinally (vertically) parallel with each other.

Although the LCD is utilized as a display in this embodiment, an EL (Electronic Luminescence) display, a plasma display, etc. may be used in place of the LCD.

As can be understood from FIG. 1, the upper housing 16a has a plane shape larger in size than a plane shape of the LCD 12, and has an opening formed so as to expose a display surface of the LCD 12 from one main surface thereof. On the other hand, the lower housing 16b has a plane shape similar in size to the upper housing 16a, and has an opening formed at an approximately lateral center thereof so as to expose a display surface of the LCD 14. Furthermore, the upper housing 16a is provided with a sound release hole 22a on the right side and a sound release hole 22b on the left side in a symmetrical manner so that the LCD 12 is located between these holes. In addition, an operating switch 18 (18a, 18b, 18c, 18d, 18e, 18f, 18h, 18g, 18L and 18R) is arranged on the housing 16.

In addition, the upper housing 16a and the lower housing 16b are rotatably connected around an axis A at a lower side (lower edge) of the upper housing 16a and a part of an upper side (upper edge) of the lower housing 16b. Accordingly, in a case of not playing a game, for example, the upper housing 16a is rotated and folded in such a manner that the display surface of the LCD 12 and the display surface of the LCD 14 are face to face with each other. This makes it possible to prevent damage such as flaws from being caused to the display surface of the LCD 12 and the display surface of the LCD 14. Besides, the upper housing 16a and the lower housing 16b may be provided integrally (fixedly) to form the housing 16, instead of being rotatably connected with each other.

The operating switch 18 includes a direction instructing switch (cross switch) 18a, a start switch 18b, a select switch 18c, an action switch (A button) 18d, an action switch (B button) 18e, an action switch (X button) 18f, an action switch (Y button) 18g, a power switch 18h, an action switch (L button) 18L, and an action switch (R button) 18R. The switches 18a and 18h are positioned at the left of the LCD 14 on one main surface of the lower housing 16b. Also, the switches 18b to 18g are positioned at the right of the LCD 14 on the one main surface of the lower housing 16b. In addition, the switches 18L and 18R are placed at the left and right sides on a part of upper end (top surface) of the lower housing 16b outside a connection part with the upper housing 16a so that the connection part is located therebetween.

A direction designating switch 18a functions as a digital joystick, and is utilized for designating a moving direction of a player character (or player object) capable of being operated by a player, designating a moving direction of a cursor and so forth by operating one of four depression portions. The start switch 18b is formed by a push button and utilized for starting (restarting) and temporarily stopping (pausing) a game, and so forth. The select switch 18c is formed by a push button and used for selecting a game mode, etc.

The action switch 18d, i.e. the A button is formed by a push button, and allows the player character to perform an arbitrary action other than direction designation, such as hitting (punching), throwing, holding (obtaining), riding, jumping, etc. For example, in an action game, it is possible to designate jumping, punching, operating a weapon, etc. In a role-playing game (RPG) or a simulation RPG, it is possible to designate obtaining a game item, selecting and deciding a weapon or a command, etc. The action switch 18e, i.e. the B button is formed by a push button and utilized for changing the game mode selected by the select switch 18c, canceling the action decided by the A button, and so forth.

The action switch 18e, i.e. X button and the action switch 18f, i.e. Y button are formed by push buttons and used as auxiliary buttons in the case where it is impossible to make the game progress only with the push button A and the push button B. As a matter of course, it is not necessarily required to use the X button and the Y button in playing the game. The power switch 18h is a switch for powering on or off the game apparatus 10.

The action switch 18L (left depression button) and the action switch 18R (right depression button) are formed by push buttons. The left depression button (L button) 18L and the right depression button (R button) 18R can be used for the same operations as those with the A button 18d and the B button 18e, and also used for operations subsidiary to the A button 18d and the B button 18e.

The game apparatus 10 is also a game apparatus using a touch panel, and the LCD 14 is provided with a touch panel 20 on top surface thereof. The touch panel 20 may be any one of resistance film type, optical type (infrared ray type) and electrostatic capacitive coupling type, for example. When its top surface is operated by depressing, stroking (touching) or the like with a stick 24, a pen (stylus pen) or a finger (hereinafter, referred to as "stick 24 or the like" in some cases), the touch panel 20 detects the coordinate position of the stick 24 or the like, and outputs corresponding coordinate data.

In this embodiment, a resolution of the display screen of the LCD 14 is 228 dots×192 dots (the same or the approximate same applies to the LCD 12), and a detection accuracy of the touch panel 20 is also rendered 228 dots×192 dots in correspondence to the resolution of the display screen. Alternatively, the detection accuracy of the touch panel 20 may be either lower or higher than the resolution of the display screen.

In playing a certain kind of game, for example, the LCD 14 with the touch panel 20 displays a game screen to be viewed and operated by the player, and the LCD 12 displays a game screen to be viewed by the player. More specifically, the LCD 12 displays an image in which an object is moving on a lattice-shaped path formed by horizontal lines and vertical lines. Displayed in the game screen on the LCD 14 are only vertical lines as if the lattice is not completely prepared. The player performs an operation in such a manner as to draw horizontal lines on the touch panel 20 by touching the touch panel 20 directly with the stick 24 or the like. In this manner, the player draws on the LCD 14 the rest of the path to be displayed on the LCD 12 in order to complete the path for guiding the moving object to a predetermined position. Besides, the LCD 14 may be used for other various input operations according to the kinds of the game and, for example, it is possible to display character information, icons, etc. on the display screen of the LCD 14 so that the player can select a command.

As stated above, the game apparatus 10 has the LCD 12 and the LCD 14 as a display part of two screens, and either of them is provided with the touch panel 20 on the display screen thereof (LCD 14 in this embodiment). Thus, the game apparatus 10 has the two screens (LCDs 12 and 14) and the two operating parts (18 and 20).

Furthermore, in this embodiment, the stick 24 can be stored in a housing portion (housing slot) (not shown) provided on one side (right-of-center portion) of the upper housing 16*a*, for example, and taken out therefrom as necessary. In the case of not providing the stick 24, it is not necessary to provide the housing portion as well.

Also, the game apparatus 10 includes a memory card (or game cartridge) 26. The memory card 26 is detachable and inserted into a loading slot (not shown) provided on a rear surface or an upper edge (side) of the lower housing 16*b*. Although not shown in FIG. 1, a connector 46 (see FIG. 2) is provided in the back of the loading slot for connection with a connector (not shown) provided at a leading edge of the memory card 26 in the loading direction. When the memory card 26 is loaded into the loading slot, the connectors are connected with each other, which allows the memory card 26 to be accessible to a CPU core 42 (see FIG. 2) of the game apparatus 10.

Figure 2:
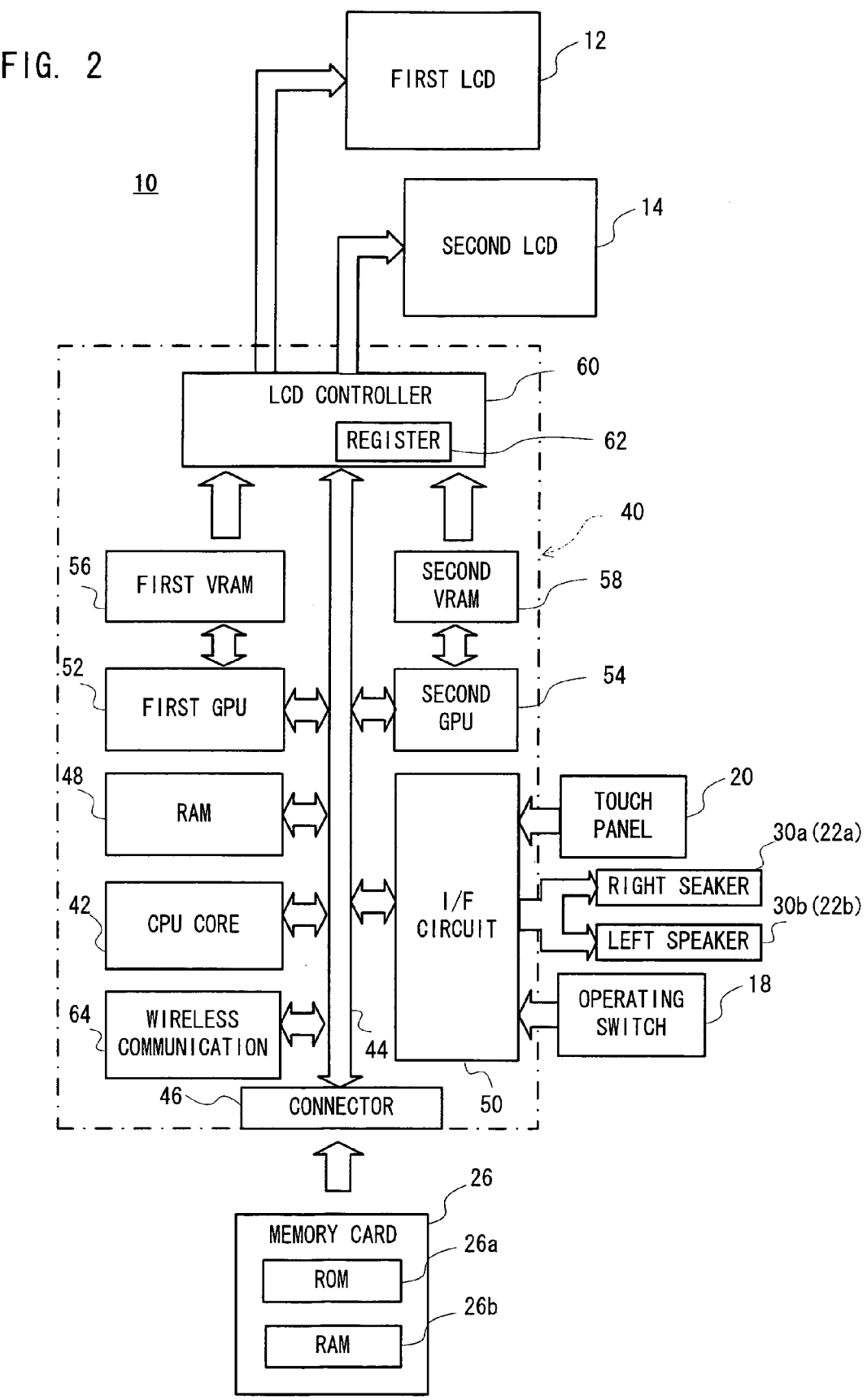
FIG. 2 is a block diagram showing one example of inner configuration of FIG. 1 embodiment.

Although not represented in FIG. 1, a right speaker 30*a* is provided at a position corresponding to the sound release hole 22*a* and a left speaker 30*b* is provided at a position corresponding to the sound release hole 22*b* inside the lower housing 16*b* (see FIG. 2).

Furthermore, although omitted in FIG. 1, for example, a battery accommodating box is provided on a rear surface of the lower housing 16*b*, and a power switch, a volume control, an external expansion connector, an earphone jack, etc. are provided on a bottom surface of the lower housing 16*b*.

Hereinafter, the two LCDs 12 and 14 are assumed to be in the same plane and a direction perpendicular to the axis A and moving from the LCD 12 toward the LCD 14 is defined as "X direction".

FIG. 2 is a block diagram showing an electrical configuration of the game apparatus 10. Referring to FIG. 2, the game apparatus 10 includes an electronic circuit board 40 on which circuit components such as the CPU core 42, etc. are packaged. The CPU core 42 is connected via a bus 44 with the connector 46, a RAM 48, a first GPU (graphics processing unit) 52, a second GPU 54, an I/F circuit 50, and an LCD controller 60, and a wireless communication unit 64.

The connector 46 is detachably connected with the memory card 26 as described above. The memory card 26 includes a ROM 26*a* and a RAM 26*b*. Although not illustrative, the ROM 26*a* and the RAM 26*b* are connected with each other via a bus, and also connected with the connector (not shown) to be connected with the connector 46. Accordingly, the CPU core 42 gains access to the ROM 26*a* and the RAM 26*b*.

The ROM 26*a* stores in advance a game program for a game to be executed by the game apparatus 10, image data for character images, background images, item images, message images, etc., sound data for sound effects, BGM, game characters' onomatopoeic sounds. The backup RAM 26*b* saves data on the game in progress and data on the result of the game.

The RAM 48 is utilized as a buffer memory or a working memory. That is, the CPU core 42 loads the game program, the image data, the sound data, etc. stored in the ROM 26*a* of the memory card 26 into the RAM 48, and executes the loaded game program. The CPU core 42 stores in the RAM 48 temporary data such as game data and flag data in accordance with the progress of the game.

Besides, the game program, the image data, the sound data, etc. are loaded from the ROM 26*a* collectively at a time, or partially and sequentially as required, and are stored in the RAM 48.

Each of the GPU 52 and the GPU 54 forms a part of a rendering means and is composed of a single chip ASIC, for example. When receiving a graphics command (rendering instruction) from the CPU core 42, the GPU 52 or 54 generates game image data according to the graphics command. The CPU core 42 here provides each of the GPU 52 and the GPU 54 with an image generating program (included in the game program) required to generate the game image data, in addition to the graphics command.

Besides, data required for execution of the graphics command (image data for polygon, texture, etc.) is stored in the RAM 48 and obtained by the GPU 52 or 54.

Furthermore, the GPU 52 is connected with a VRAM 56, and the GPU 54 is connected with a VRAM 58. The GPU 52 renders the generated game image data in the VRAM 56, and the GPU 54 renders the generated game image data in the VRAM 58.

The VRAMs 56 and 58 are connected to an LCD controller 60. The LCD controller 60 includes a register 62. The register 62 is composed of one bit, for example, and stores a data value of "0" or "1" under an instruction from the CPU core 42. When the data value in the register 62 is "0", the LCD controller 60 outputs the game image data rendered in the VRAM 56 to the LCD 14, and outputs the game image data rendered in the VRAM 58 to the LCD 12. Furthermore, when the data value in the register 62 is "1", the LCD controller 60 outputs the game image data rendered in the VRAM 56 to the LCD 12, and outputs the game image data rendered in the VRAM 58 to the LCD 14.

The I/F circuit 50 is connected with the operating switch 18, the touch panel 20, the right speaker 30*a* and the left speaker 30*b*. Here, the operating switch 18 is composed of the above described switches 18*a*, 18*b*, 18*c*, 18*d*, 18*e*, 18*f*, 18*g*, 18*h*, 18L and 18R. When the operating switch 18 is operated, a corresponding operation signal (operation data) is input to the CPU core 42 via the I/F circuit 50. Coordinate data detected by the touch panel 20 is also input into the CPU core 42 via the I/F circuit 50. The CPU core 42 also reads the sound data necessary for the game such as BGM, sound effects and game characters' onomatopoeic sounds from the RAM 48, and outputs it from the right speaker 30*a* and the left speaker 30*b* via the I/F circuit 50.

When the two-player mode is selected, radio signals are exchanged with an opponent's game apparatus through the wireless communication unit 64. More specifically, the wireless communication unit 64 modulates communication data for the opponent into a radio signal and transmits it via an antenna (not shown), and also receives a radio signal from the opponent's game apparatus via the same antenna and demodulates it.

Figure 3:
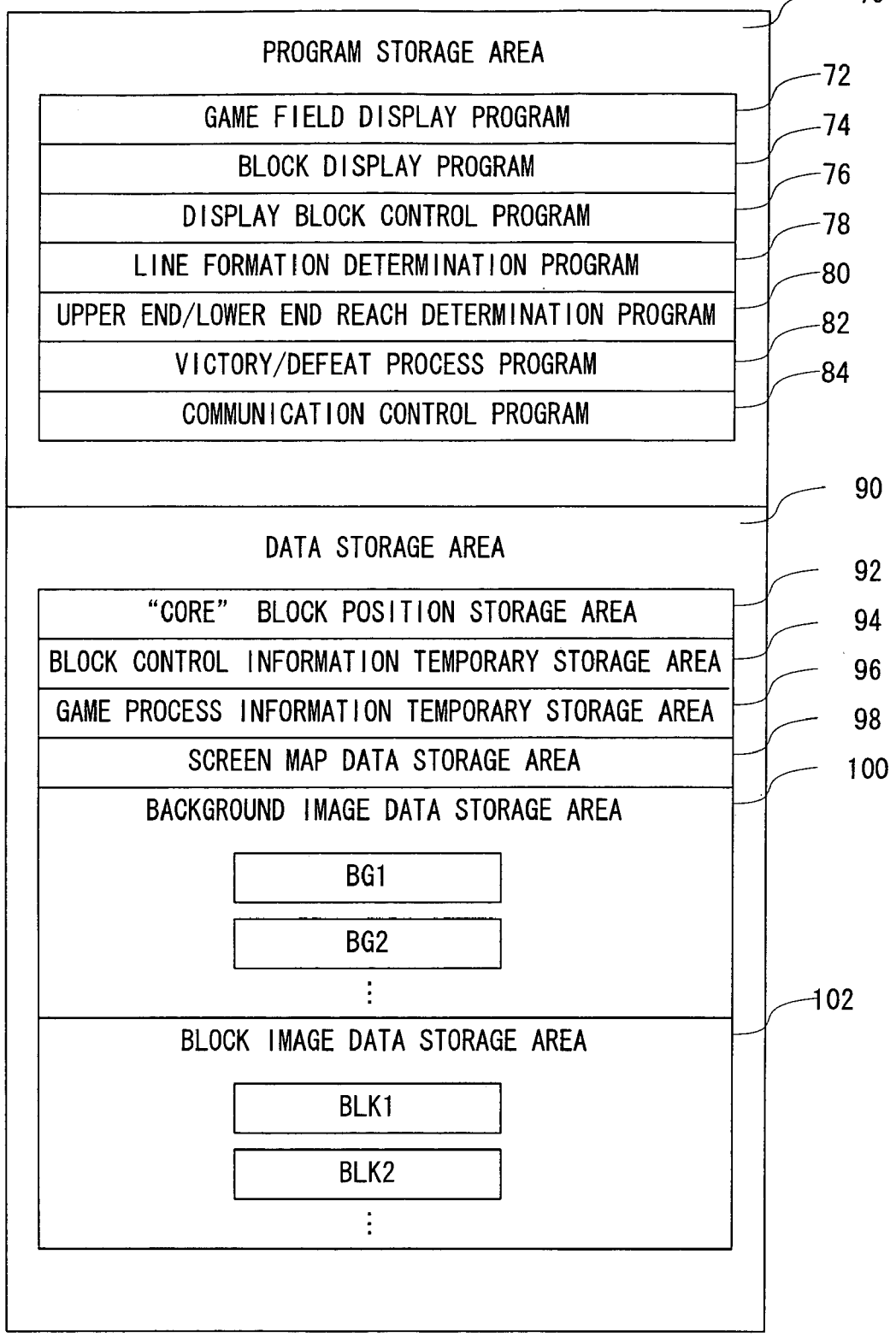
FIG. 3 is an illustrative view showing one example of mapping state of a RAM applied to FIG. 1 embodiment.

FIG. 3 shows one example of a memory map of the RAM 48. The RAM 48 includes a game program storage area 70 for storing a program loaded from the ROM 26*a* of the memory card 26. The program to be loaded includes a game field display program 72, a block display program 74, a display block control program 76, a line formation determination program 78, an upper end/lower end reach determination program 80, a victory/defeat process program 82, a communication control program 84, etc.

Besides, the program storage area 70 stores various kinds of other programs required for the progress of the game, including a program for generating/outputting game images and game sounds.

The game field display program 72 is a program for displaying a game field on the LCDs 12 and 14. The block display program 74 is a program for displaying various kinds of blocks in the game field. The block control program 76 is a program for subjecting the blocks to a movement process, rotation process, etc.

The line formation determination program 78 is a program for making the determination on the formation of a line, that is, for determining whether or not a predetermined number of blocks are aligned along an axis A with no space between them. The upper end/lower end reach determination program 80 is a program for determining whether or not a block has reached the upper end or lower end of the game field. The victory/defeat process program 82 is a program for performing a defeat process/victory process in relation to result of the determination by the upper end/lower end reach determination program 80. The communication control program 84 is a program for exchanging signals, i.e. game process information, with other game machines.

In addition, the RAM 48 includes a data storage area 90. The data storage area 90 has a core block position storage area 92, a block control information temporary storage area 94, a game process information temporary storage area 96, a screen map data storage area 98, a background image data storage area 100 and a block image data storage area 102.

The "core" block position storage area 92 is an area for storing a display position of a "core" block (described later). The block control information temporary storage area 94 is an area for temporarily storing block control information referred to by the block control program 76. The game process information temporary storage area 96 is an area for temporarily storing game process information received from other game machines.

The screen map data storage area 98 is an area for storing screen map data. The background image data storage area 102 is an area for storing image data corresponding to a plurality of unit characters (BG1, BG2, . . . ) forming a background. The screen map data describes which unit images are to be displayed in what positions. Thus, a background image can be obtained by arranging the unit characters according to the screen map data.

The block image data storage area 102 is an area for storing image data corresponding to various kinds of blocks. The images of those blocks can be obtained by processing the image data according to the block control information.

With the game apparatus 10 configured as stated above, a match game advances according to the procedures shown in FIG. 4 to FIG. 9, FIG. 10(A) and FIG. 10(B), FIG. 11(A) and FIG. 11(B), FIG. 12(A) and FIG. 12(B), and FIG. 13(A) and FIG. 13(B). Those drawings have no background and show the axis A and the X direction. In addition, when one block is displayed in a divided state on the LCD 12 and the LCD 14 or when a point of attention comes close to an end of the screen, the game screen will be scrolled accordingly, although screen scrolling is omitted in those drawings.

Figure 4:
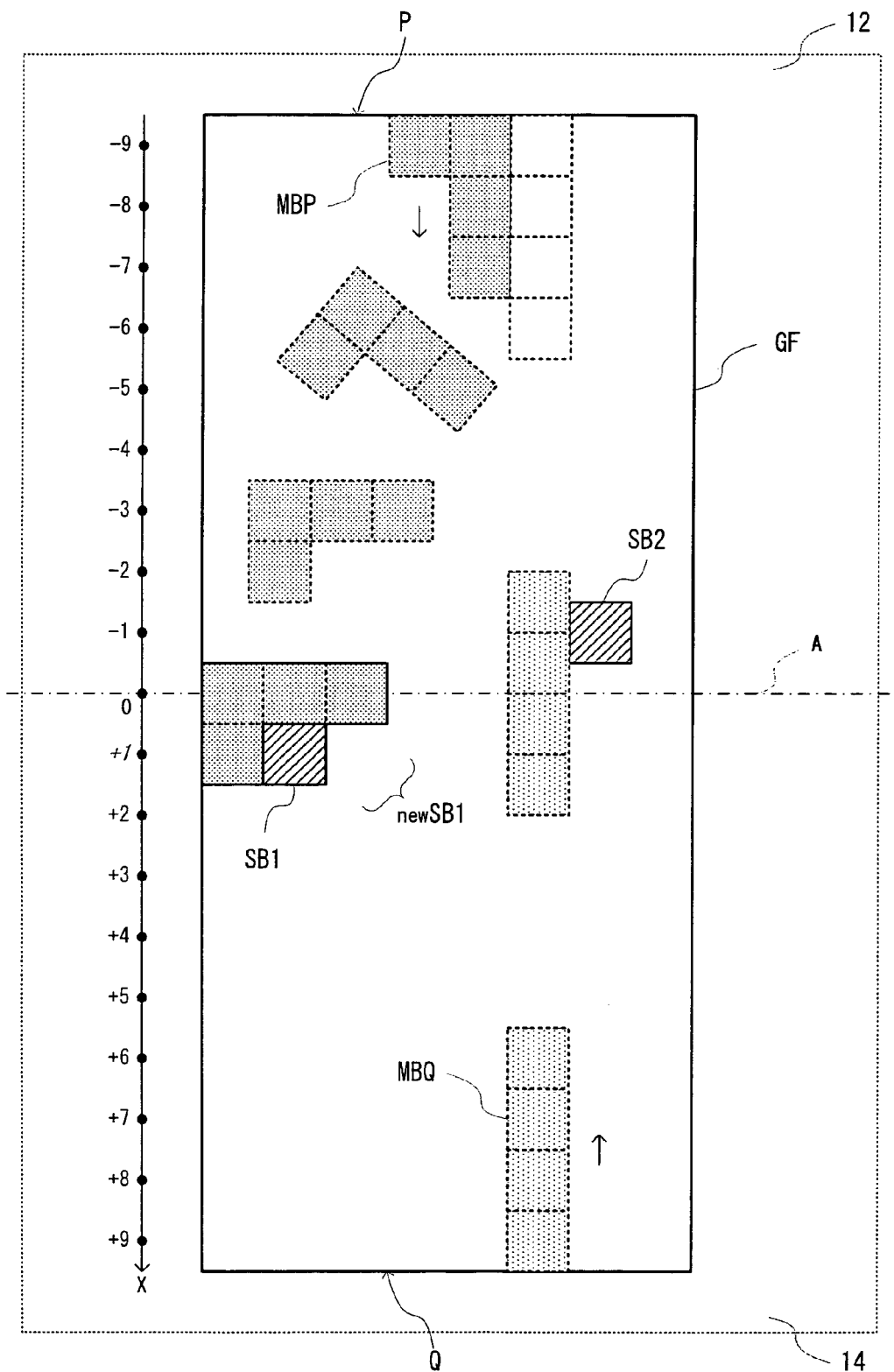
FIG. 4 is an illustrative view showing one example of game screen applied to FIG. 1 embodiment.

Referring to FIG. 4, a game start operation is performed via the operating switch 18, a game field GF is displayed across the LCDs 12 and 14. The game field GF is 8 blocks wide by 19 blocks high and has two "core" blocks SB1 and SB2 displayed in predetermined positions. The "core" blocks mean initial fixed blocks that are displayed at start of a game. Each of the "core" blocks SB1 and SB2 is formed by one unit block piece and may be formed by a plurality of unit block pieces.

An upper base P of the game field GF is the player's deadline, and a lower base Q thereof is the opponent's deadline. Besides, the opponent is a computer (the CPU core 42) in one-player mode, and is the other player who operates the other game machine in two-player mode.

When a game start operation is carried out through the operating switch 18, a moving block MBP moving in the X direction is displayed near the upper base P. The player performs a lateral movement operation and/or a rotation operation on the moving block MBP. Accordingly, the moving block MBP gets caught and fixed on the "core" block SB1. That is, the "core" block SB1 and the moving block MBP constitute a new fixed block SB1.

At the same time, a moving block MBQ moving in a direction opposite to the X direction is displayed in proximity to the lower base Q. The moving block MBQ is under the action of the opponent's lateral movement/rotation operation. Without any action, the moving block MBQ goes straight in an initial posture. If there exists no fixed block in its course, the moving block MBQ disappears upon reaching the upper base P.

As stated above, the moving block MBP or MBQ continues to move unless it gets caught on the fixed block, and then disappears when it has reached the lower base Q or the upper base P. That is, if the moving blocks (MBP and MBQ) contact or overlap with each other, they pass by each other without getting caught on each other, and then continue to move.

Figure 5:
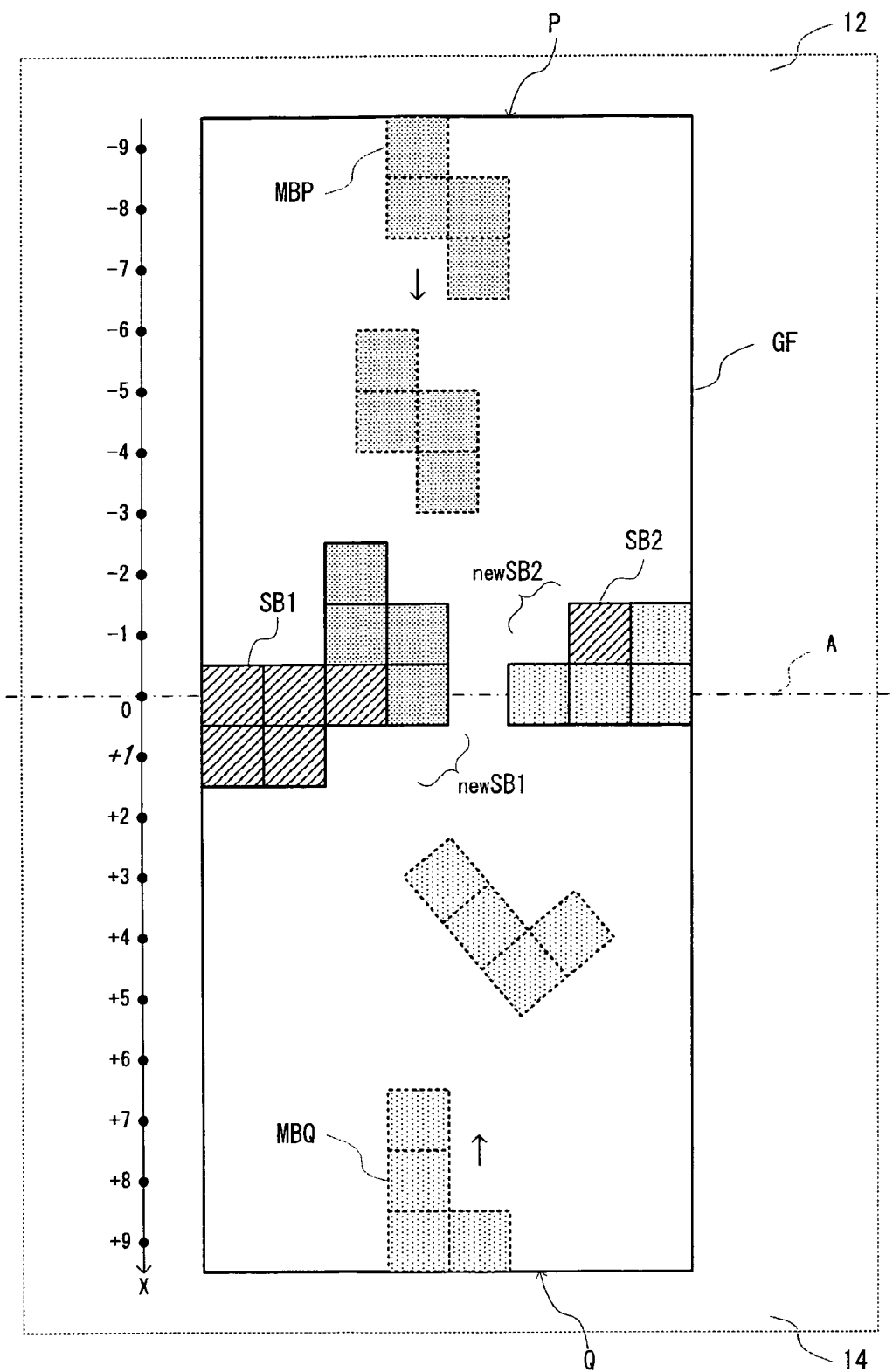
FIG. 5 is an illustrative view showing another example of game screen applied to FIG. 1 embodiment.

Referring to FIG. 5, a next moving block MBP is displayed near the upper base P. As result of the player's lateral movement/rotation operation, this moving block MBP gets caught on the fixed block SB1, and the moving block MBP and the fixed block SB1 constitute a new fixed block SB1.

At the same time, a next moving block MBQ is displayed in the vicinity of the lower base Q. This moving block MBQ get caught on the fixed block SB2 by the opponent's lateral movement/rotation operation, and the moving block MBQ and the fixed block SB2 constitute a new fixed block SB2.

Figure 6:
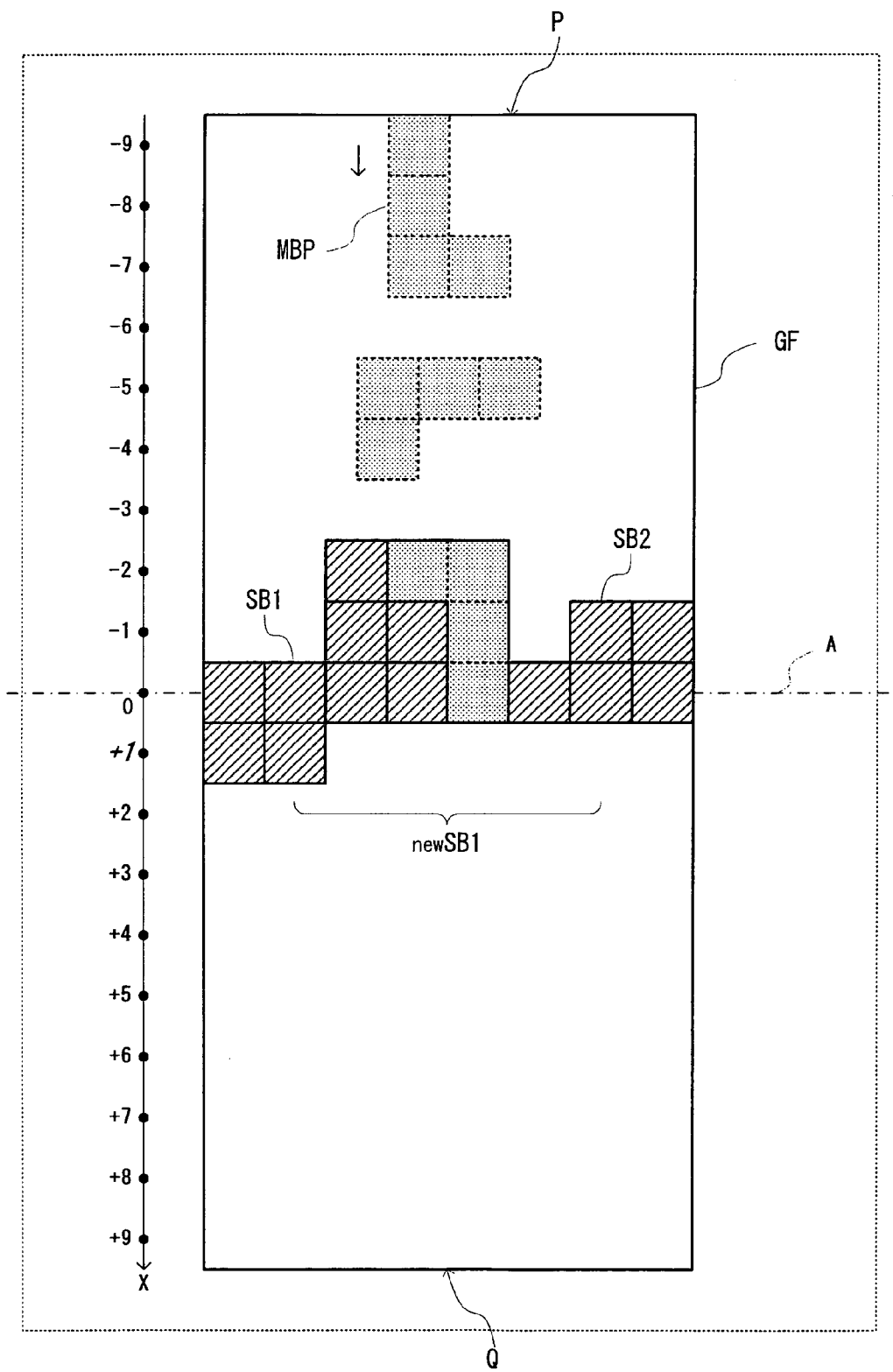
FIG. 6 is an illustrative view showing still another example of game screen that is applied to FIG. 1 embodiment.

Referring to FIG. 6, a further next moving block MBP is displayed near the upper base P. As result of the player's lateral movement/rotation operation, this moving block MBP get caught on the fixed block SB1, and the moving block MBP and the two fixed blocks SB1 and SB2 constitute a new fixed block SB1. Besides, drawings and descriptions of the moving block MBQ and its related processes are omitted hereinafter.

A new fixed block SB1 contains eight unit block pieces that are aligned at a position of X=0 with no space between them. That is, one line is formed with X=0. The eight unit block pieces forming the line are erased in such a manner as shown in FIG. 7.

Figure 7:
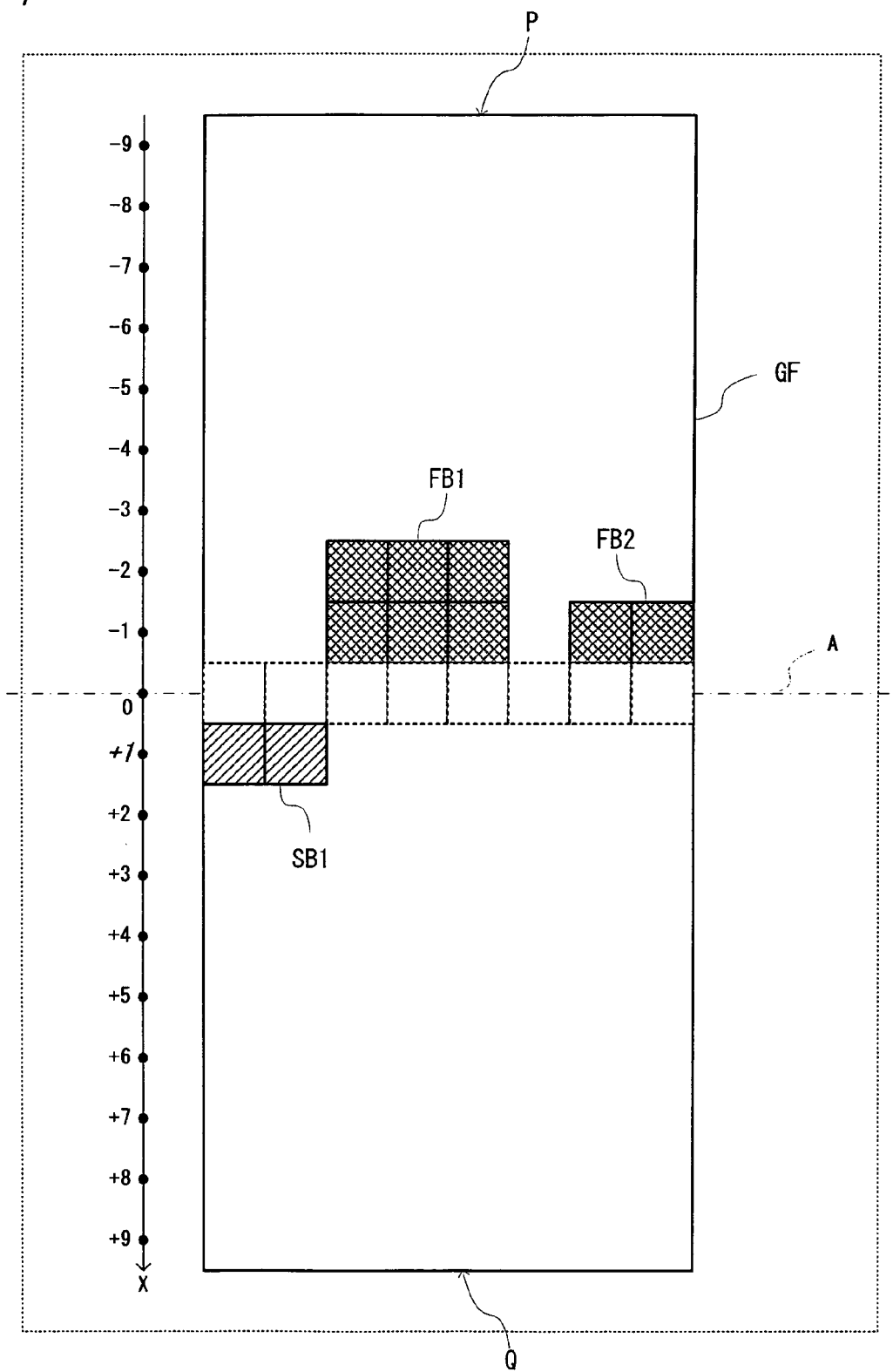
FIG. 7 is an illustrative view showing further another example of game screen that is applied to FIG. 1 embodiment.

Referring to FIG. 7, in consequence of the erase of the eight unit block pieces, two floating blocks FB1 and FB2 and a fixed block SB1 come into existence.

Figure 8:
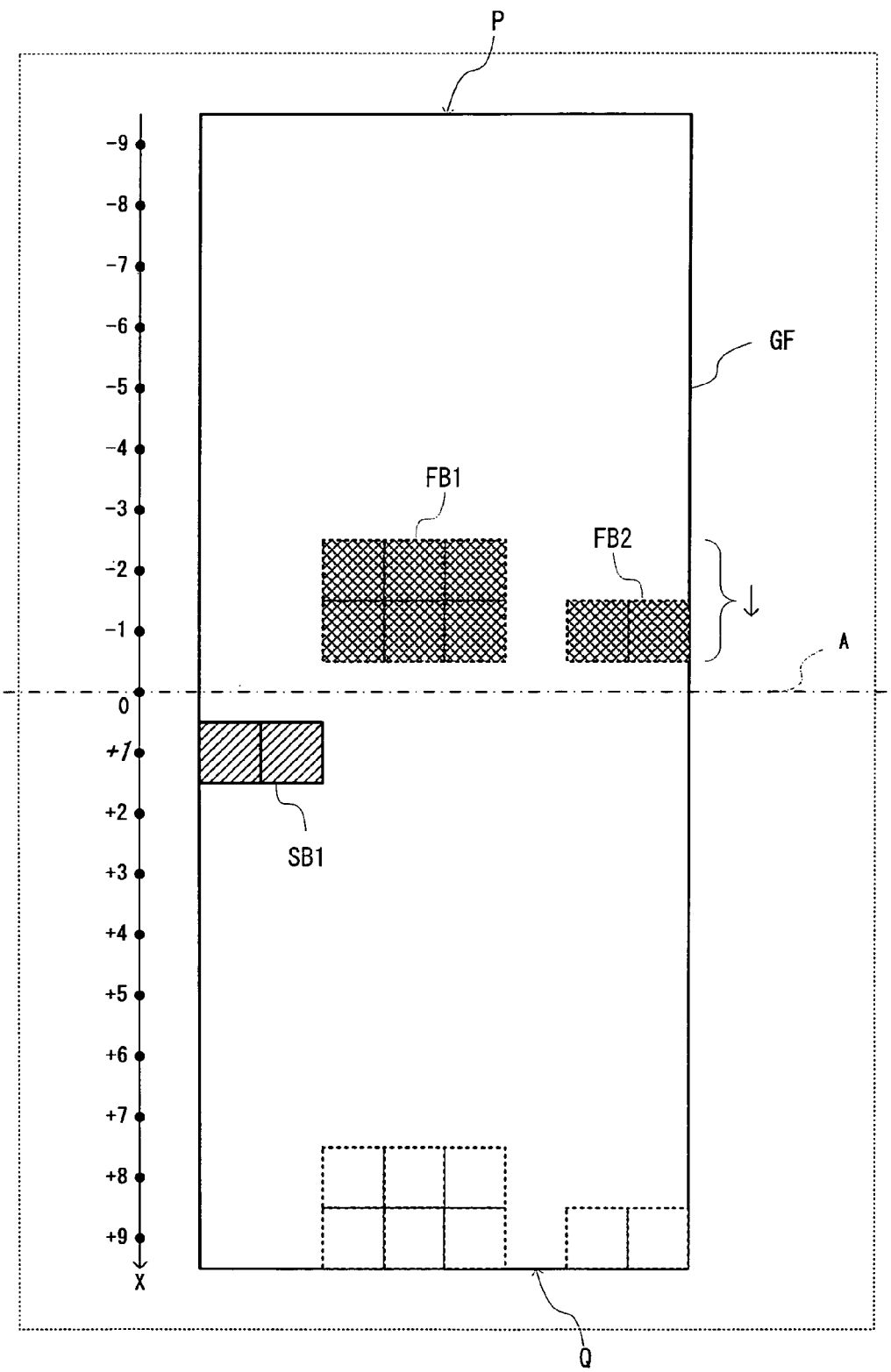
FIG. 8 is an illustrative view showing another example of game screen applied to FIG. 1 embodiment.

Referring to FIG. 8, the two floating blocks FB1 and FB2 move downward and disappear upon reaching the lower base Q. If there exists any fixed block in the floating block's course, this fixed block and the floating block constitute a new fixed block.

Figure 9:
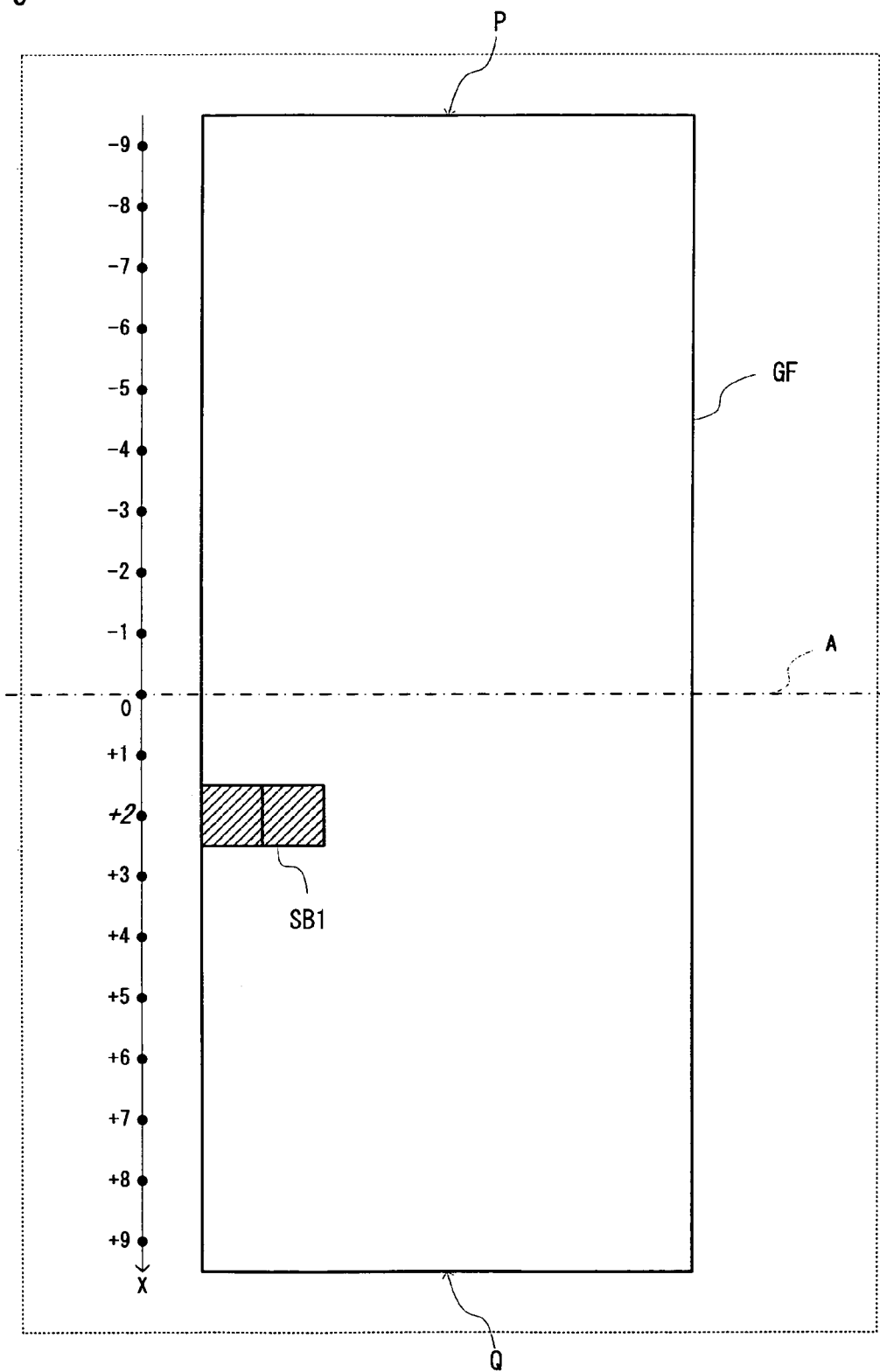
FIG. 9 is an illustrative view showing still another example of game screen applied to FIG. 1 embodiment.

After that, the fixed block SB1 at a position of X=+1 is displaced to a position of X=+2 as shown in FIG. 9, that is, displaced downward by one stage.

Here, the number of displacement stage(s) varies depending on the number of erased line(s). For example, displacement takes place by two stages if two lines are erased, and displacement occurs by four stages if three lines are erased. The direction of displacement is downward if the line erase is based on the player's operation, and is upward if the line erase is based on the opponent's operation.

The fixed block displacement may be carried out only if a plurality of lines have been erased. That is, no fixed block displacement may be performed if one line is erased, one-stage displacement may be performed if two lines are erased, two-stage displacement may be performed if three lines are erased, and four-stage displacement may be performed if four lines are erased.

Figure 10:
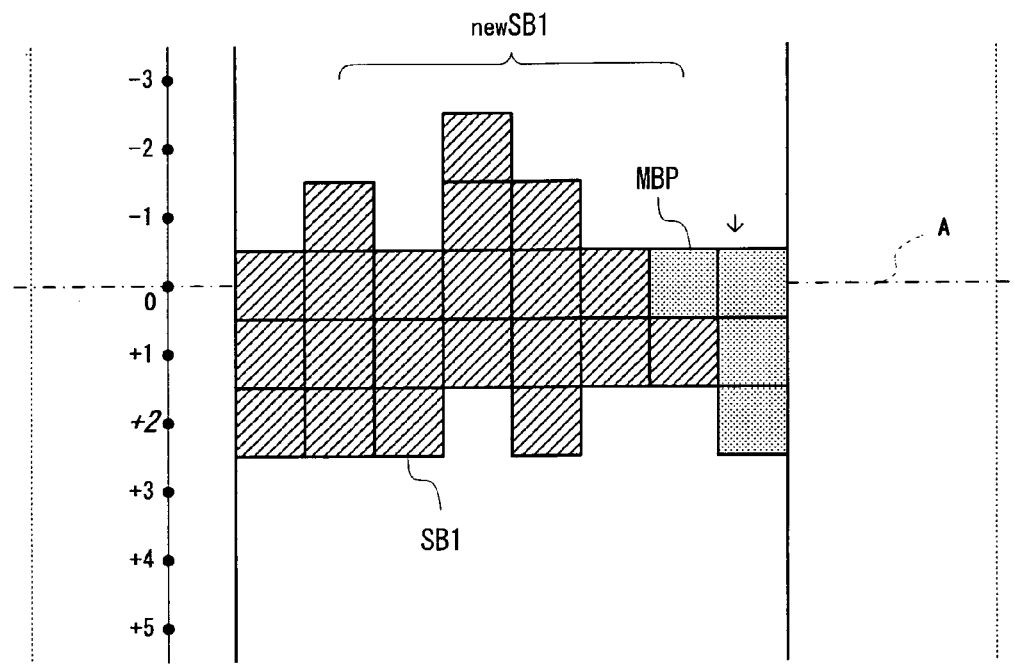
FIG. 10 (A) is an illustrative view showing further another example of game screen applied to FIG. 1 embodiment.
Figure 10:
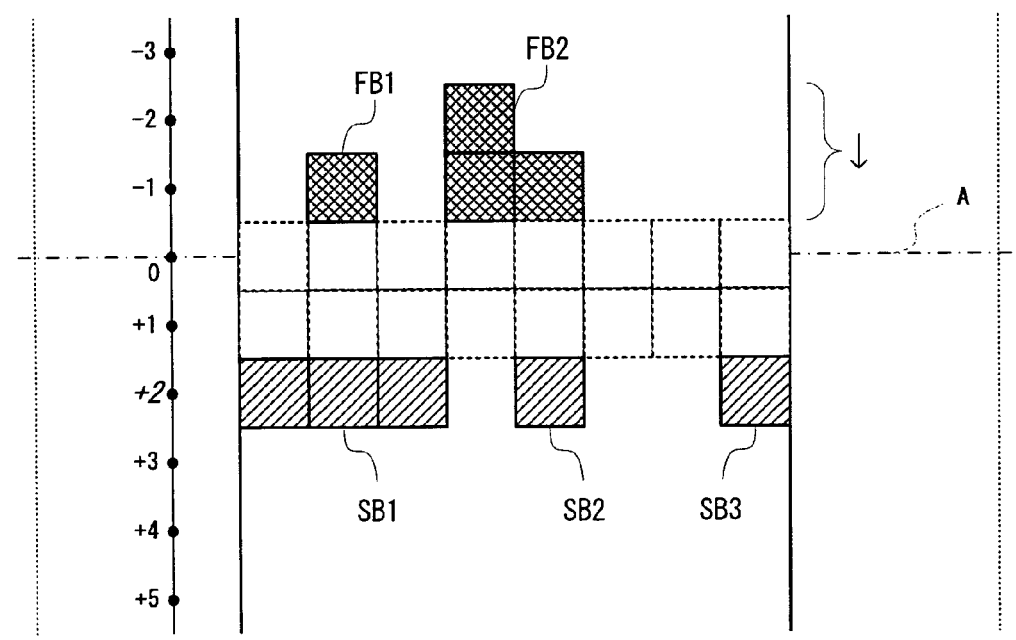

Assuming that, subsequently, the game has further advanced and a fixed block SB1 has been formed as shown in FIG. 10(A). A lower end of the fixed block SB1 is located at a position of X=+2. The moving block MBP from the upper base P gets caught on the fixed block SB1, and the fixed block SB1 and the moving block MBP constitute a new fixed block SB1. In the new fixed block SB1, one each line is formed at positions of X=0 and X=+1, that is, two lines are formed.

Sixteen unit block pieces constituting the formed two lines are erased in a manner shown in FIG. 10(B). As a result, three fixed blocks SB1, SB2 and SB3 and two floating blocks FB1 and FB2 come into existence. The floating blocks FB1 and FB2 move downward and get caught on the fixed blocks SB1 and SB2, respectively. Consequently, the fixed block SB1 and the floating block FB1 constitute a new fixed block SB1 (see FIG. 11(A)), and the fixed block SB2 and the floating block FB2 constitute a new fixed block SB2 (see the same drawing).

Figure 11:
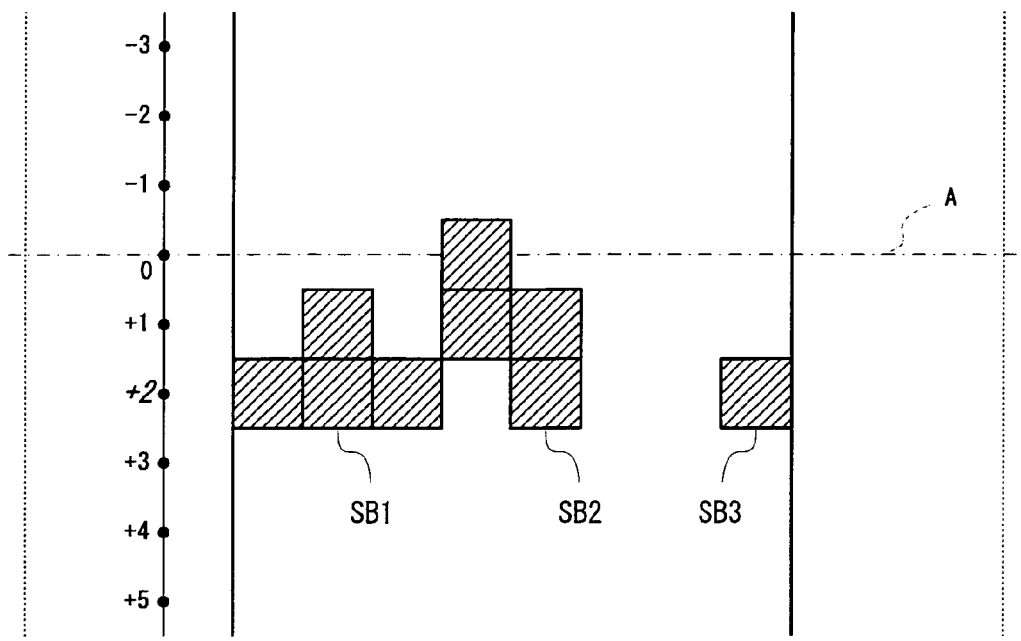
FIG. 11 (A) is an illustrative view showing still another example of game screen applied to FIG. 1 embodiment.
Figure 11:
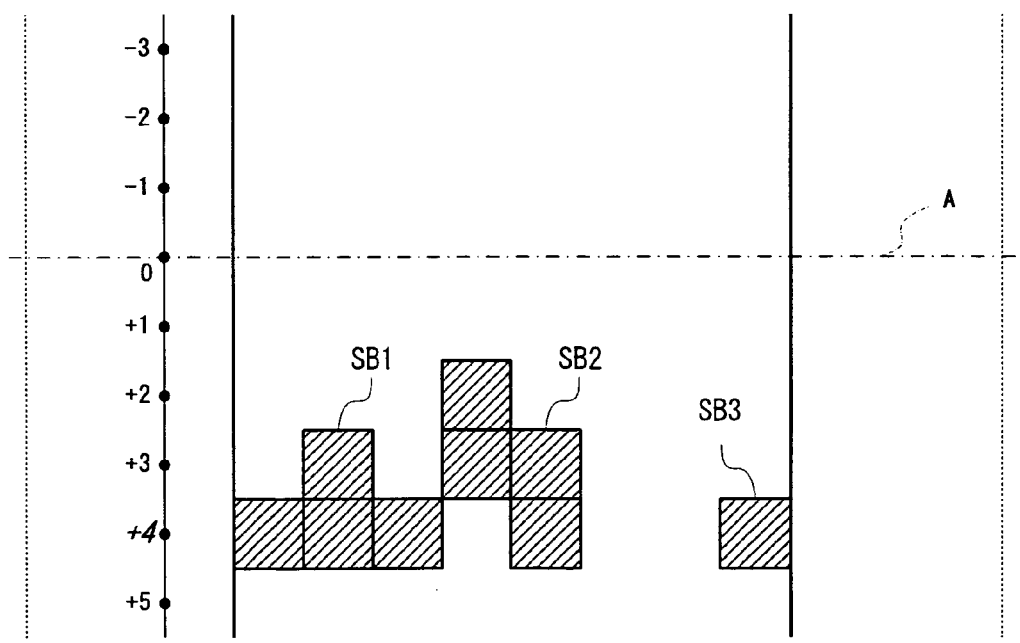

Three fixed blocks SB1, SB2 and SB3 shown in FIG. 11(A) have all their lower ends located at a position of X=+2. These fixed blocks SB1, SB2 and SB3 are each displaced downward by two stages as shown in FIG. 11(B). Accordingly, the lower ends of the fixed blocks SB1, SB2 and SB3 are all located at positions of X=+4.

Figure 12:
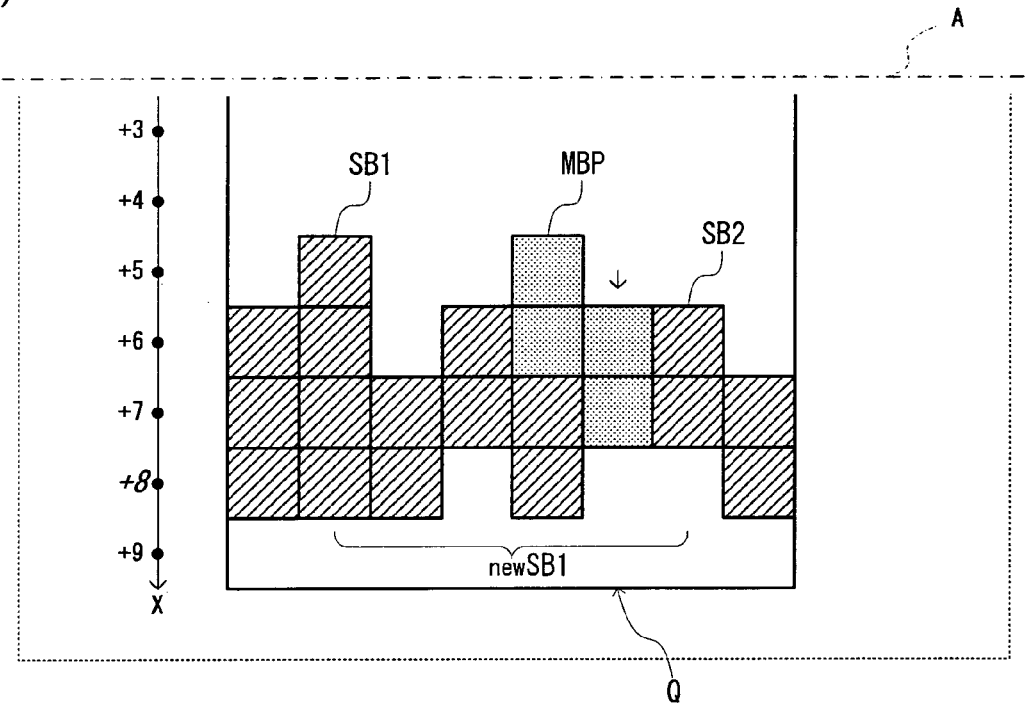
FIG. 12 (A) is an illustrative view showing another example of game screen applied to FIG. 1 embodiment.
Figure 12:
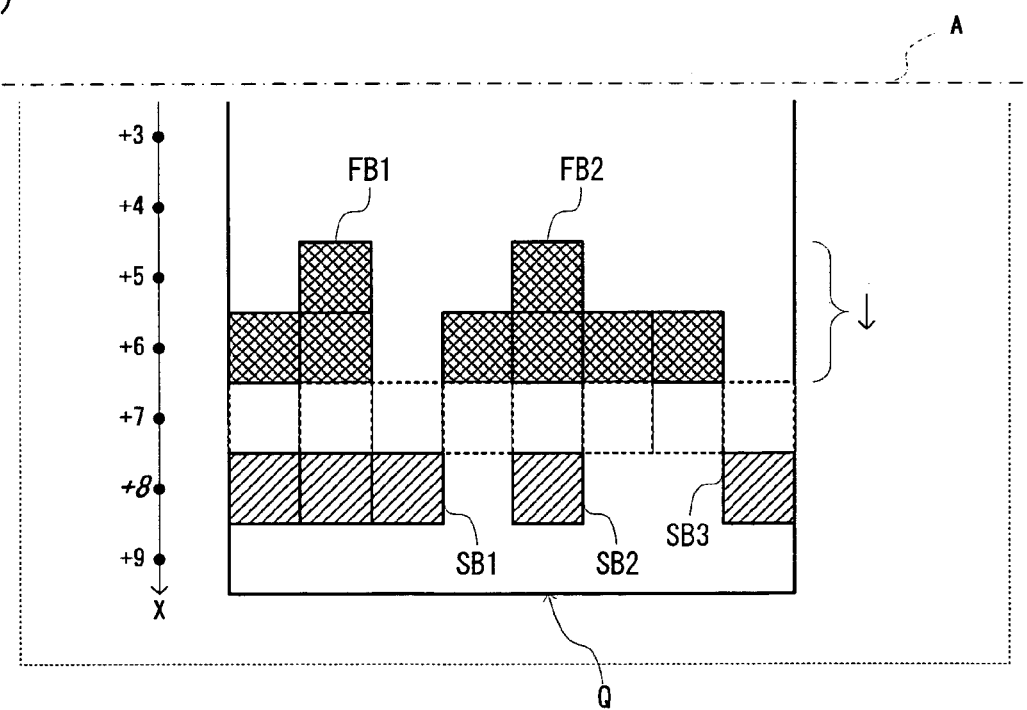

Assuming that, subsequently, the game has further advanced and two fixed blocks SB1 and SB2 are formed as shown in FIG. 12(A). The lower ends of the fixed blocks SB1 and SB2 are located at positions of X=+8. The moving block MBP from the upper base P gets caught on the fixed block SB1, and the fixed blocks SB1 and SB2 and the moving block MBP constitute a new fixed block SB1. In the new fixed block SB1, one line is formed at a position of X=+7.

Eight unit block pieces constituting the formed line is erased in a manner shown in FIG. 12(B). Thus, three fixed blocks SB1, SB2 and SB3 and two floating blocks FB1 and SB2 come into existence. The floating blocks FB1 and FB2 move downward and get caught on the fixed blocks SB1 and SB2, respectively. As a result, the fixed block SB1 and the floating block FB1 constitute a new fixed block SB1 (see FIG. 13(A)), and the fixed block SB2 and the floating block FB2 constitute a new fixed block SB2 (see the same figure).

Figure 13:
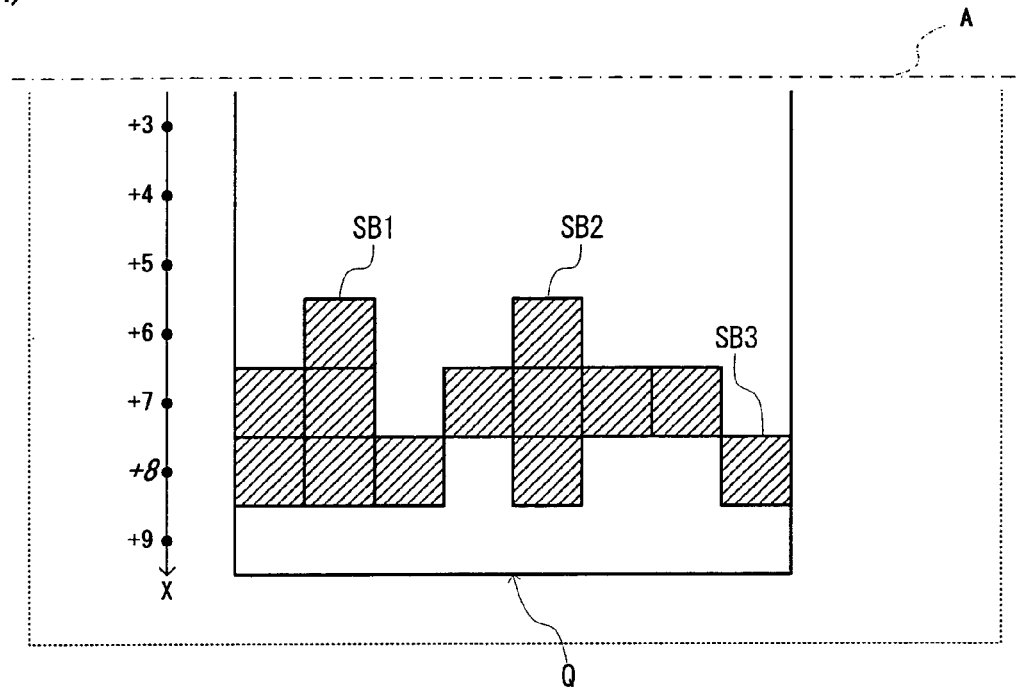
FIG. 13 (A) is an illustrative view showing further another example of game screen applied to FIG. 1 embodiment.
Figure 13:
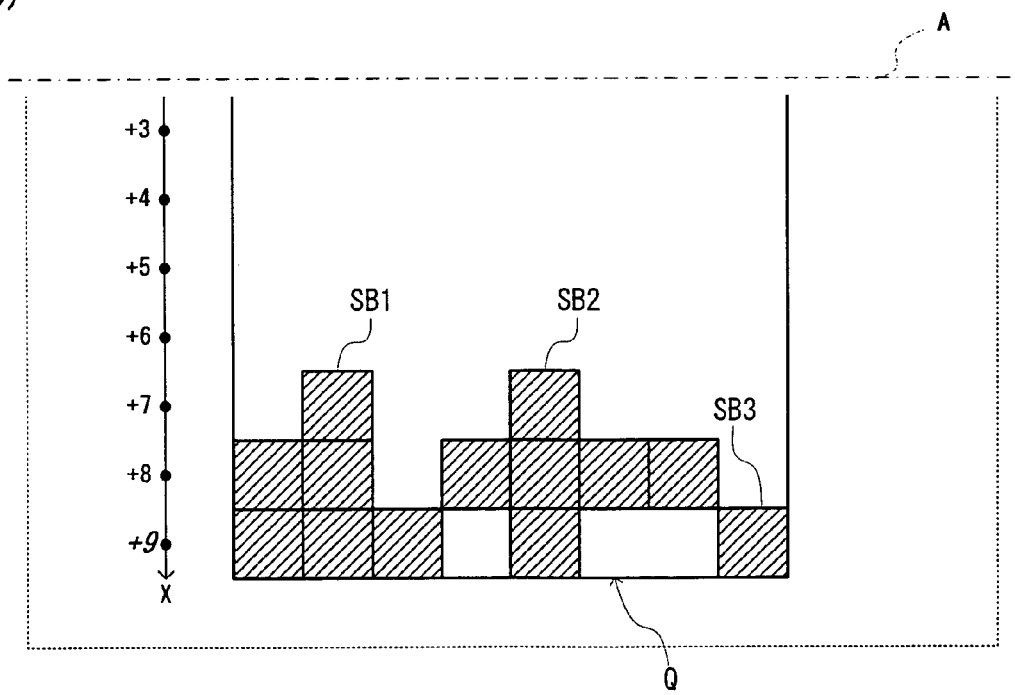

Three fixed blocks SB1, SB2 and SB3 shown in FIG. 13(A) have all their lower end located at positions of X=+8. Those fixed blocks SB1, SB2 and SB3 are displaced downward by one stage as shown in FIG. 13(B). Accordingly, the lower ends of the fixed blocks SB1, SB2 and SB3 are all located at positions of X=+9, which ends the match game in the player's victory.

Besides, if the upper ends of the fixed blocks are located at positions of X=−9, the match game ends in the opponent's victory, that is, in the player's defeat.

Moreover, in the above stated embodiment, a floating block disappears upon reaching the lower base Q (or the upper base P) unless it gets caught on some fixed block. Alternatively, the floating block may be moved downward (or upward) by the number of erased line(s). For example, if one line is erased as shown in FIG. 7, two floating blocks FB1 and FB2 may be moved downward by one line so as to constitute new fixed blocks SB1, SB2 and SB3.

Figure 14:
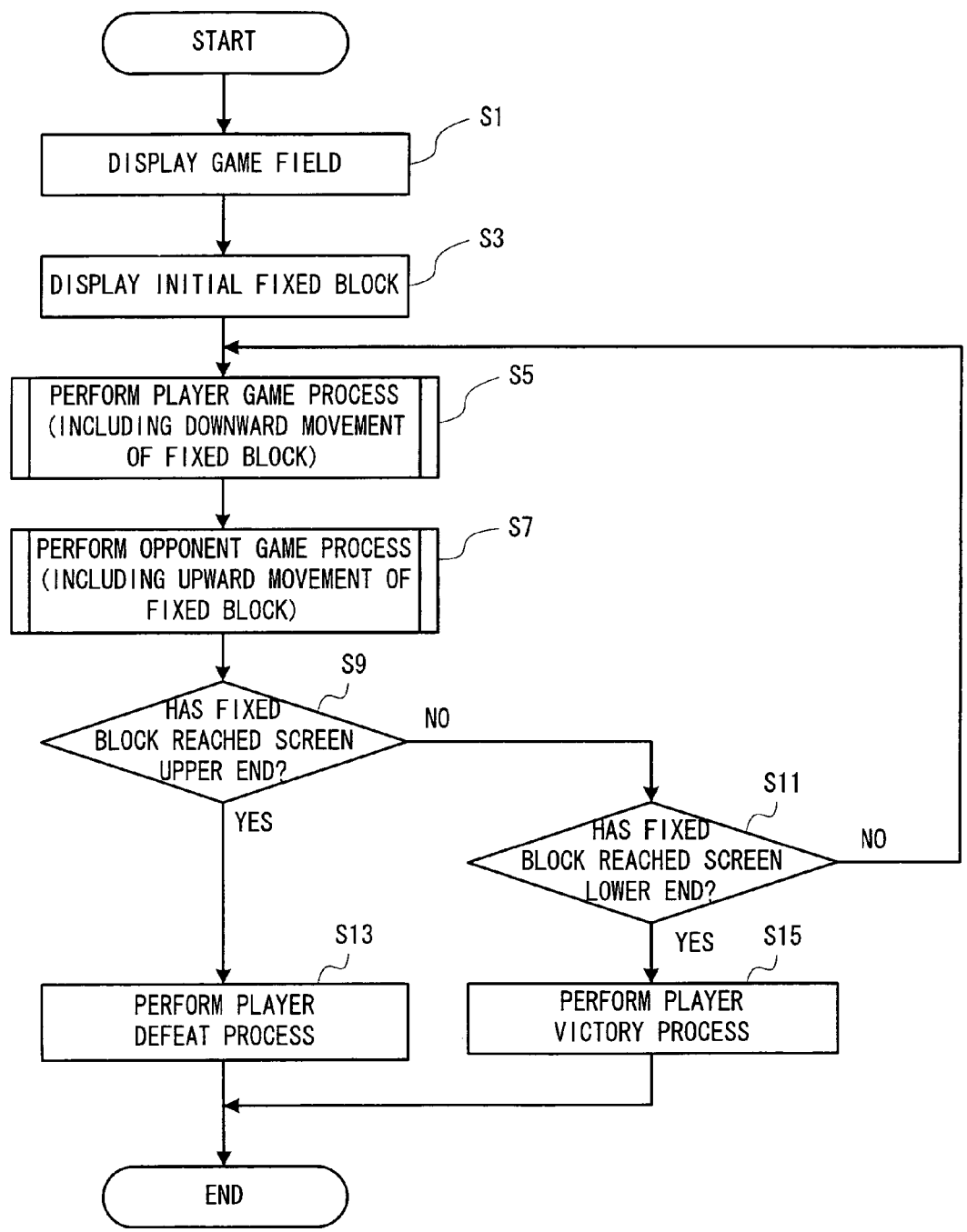
FIG. 14 is a flowchart showing a part of operation of a CPU core applied to FIG. 1 embodiment.

In playing such a match game, the CPU core 42 carries out a process in accordance with a flowchart shown in FIG. 14 to FIG. 18. Referring to FIG. 14, the CPU core 42 firstly displays the game field GF on the two LCDs 12 and 14 in a step S1. In a next step S3, the CPU core 42 displays a "core" block, i.e. initial fixed block at a predetermined position in the game field GF.

The CPU core 42 executes a player game process (see FIG. 15 and FIG. 16) in a step S5, and executes an opponent game process (see FIG. 17 and FIG. 18) in a step S7. The CPU core 42 determines in a step S9 whether or not the fixed block has reached the field upper end, i.e. the upper base P, and determines in a step S11 whether or not the fixed block has reached the field lower end, i.e. the lower base Q.

If NO in the both steps S9 and S11, the CPU core 42 returns the process to the step S5. If YES in the step S9, the CPU core 42 moves to a step S13 to execute a player defeat process. Meanwhile, when the fixed block has reached the lower base Q as shown in FIG. 13(B), for example, the CPU core 42 concludes it to be YES in a step S11 and moves to a step S15 for execution of a player victory process. Upon completion of the defeat process or the victory process, this match game is ended.

Figure 15:
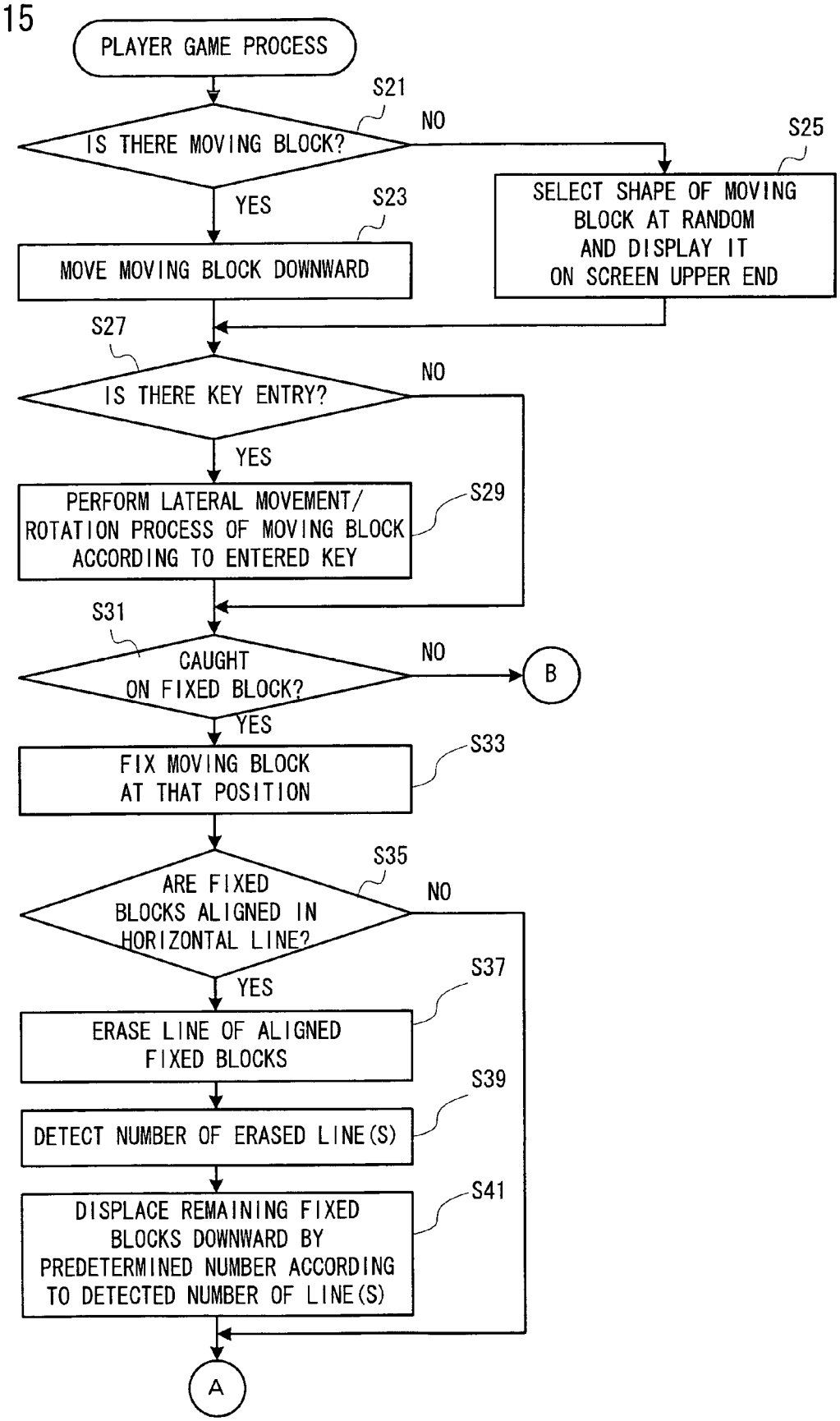
FIG. 15 is a flowchart showing another part of operation of the CPU core that is applied to FIG. 1 embodiment.

Referring to FIG. 15, the CPU core 42 determines in a step S21 whether or not there exists the player's moving block MBP (hereinafter referred to as jut "moving block") in the game field GF. If YES, the CPU core 42 performs a downward movement process on the moving block in a step S23, and then proceeds to a step S27. On the other hand, if NO in the step S21, the CPU core 42 selects randomly an arbitrary moving block from a plurality of, seven for instance, prepared moving blocks, and displays the selected moving block near the upper base P of the game field GF. After the display, the CPU core 42 moves to a step S27.

In the step S27, the CPU core 42 determines the presence or absence of some key entry, and if NO here, proceeds to a step S31. If YES in the step S27, the CPU core 42 subjects the moving block to a lateral movement process/rotation operation according to the entered code. As consequences of steps S23 and S29, the moving block draws a path as shown in FIG. 4 and FIG. 5, for example. In a succeeding step S31, the CPU core 42 determines whether the moving block has got caught on the fixed block or not, and if NO here, proceeds to a step S51.

If YES in the step S31, the CPU core 42 moves to a step S33 to fix the moving block at that position. In a next step S35, the CPU core 42 determines whether any line is formed or not, that is, whether or not eight unit block pieces in the fixed block are aligned along the axis A with no space between them. If NO in the step S35, the CPU core 42 goes to a step S43.

If YES in the step S35, the CPU core 42 erases unit block pieces forming the line(s) in a step S37, detects the number of erased line(s) in a step S39, displaces the remaining fixed blocks downward by the number of stage(s) according to the number of the erased line(s) in a step S41, and then proceeds to a step S43. For example, if the number of erased line is "1" as shown in FIG. 7, the fixed block SB1 is displaced downward by one stage as shown in FIG. 9. If the number of the erased lines is "2" as shown in FIG. 10(B), the number of displacement stages is "2" as shown in FIG. 11(B).

Figure 16:
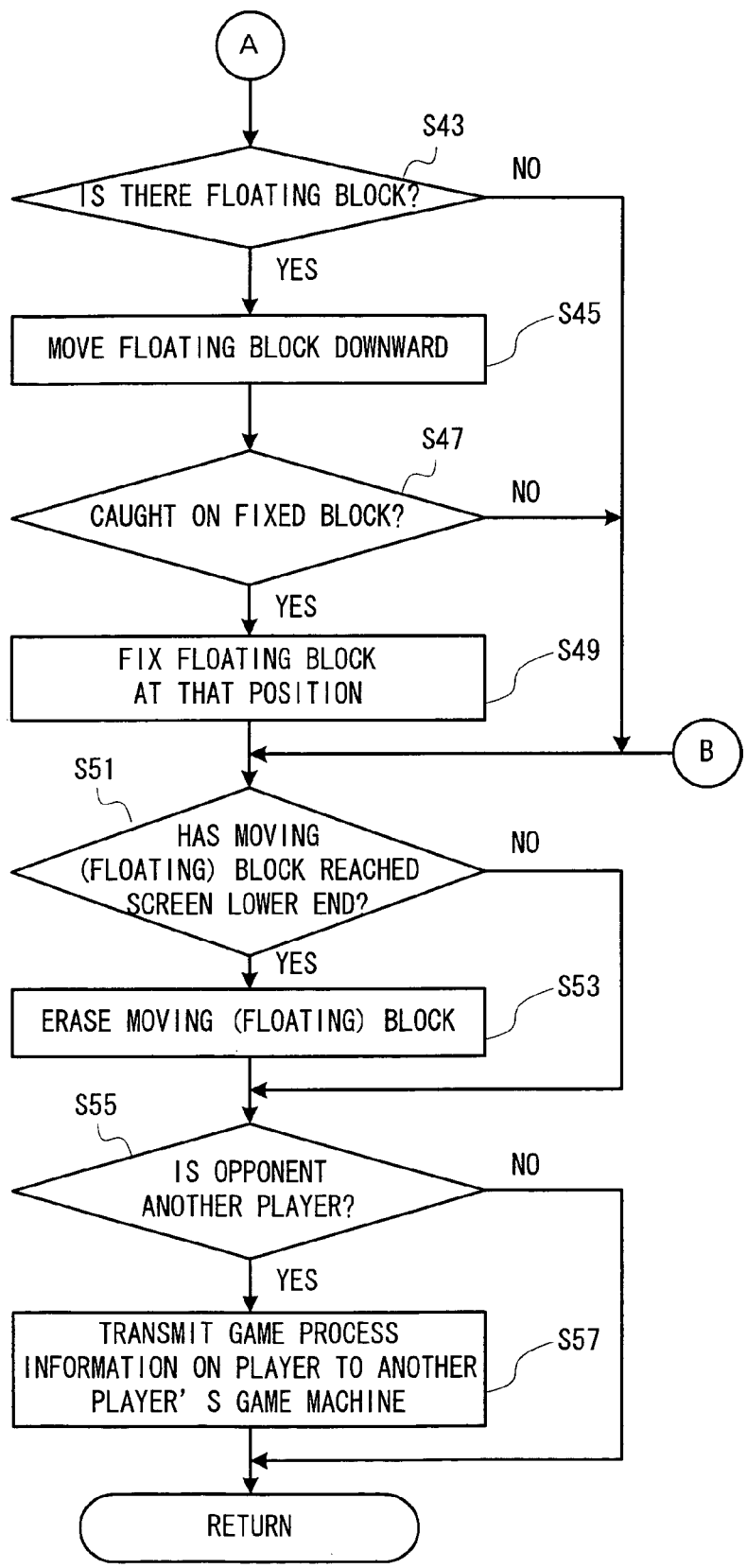
FIG. 16 is a flowchart showing still another part of operation of the CPU core applied to FIG. 1 embodiment.

Referring to FIG. 16, the CPU core 42 determines the presence or absence of a floating block (FB1, FB2, . . . ) in the step S43. If NO here, the CPU core 42 proceeds to a step S51.

On the other hand, if YES in the step S43, the CPU core 42 moves the floating block downward in a step S45, and determines in a step S47 whether the floating block has got caught on any fixed block or not. If NO here, the CPU core 42 proceeds to a step S51. If YES in the step S47, the CPU core 42 moves to a step S49 to fix the floating block at that position.

In the step S51, the CPU core 42 determines whether the moving block or the floating block has reached the lower base Q or not. If NO here, the CPU core 42 moves to a step S55. If YES here, the CPU core 42 erases the moving block or the floating block that has reached the lower base Q in a step S53, and then proceeds to a step S55.

In the step S55, the CPU core 42 determines whether the opponent is the other player or not. If YES here, the CPU core 42 transmits game process information (the entered key code, etc.) to the other player's game machine in a step S57, and then returns to a higher-layer routine. If NO in the step S55, that is, if the opponent is the CPU core 42 itself, the CPU core 42 skips the step S57.

Figure 17:
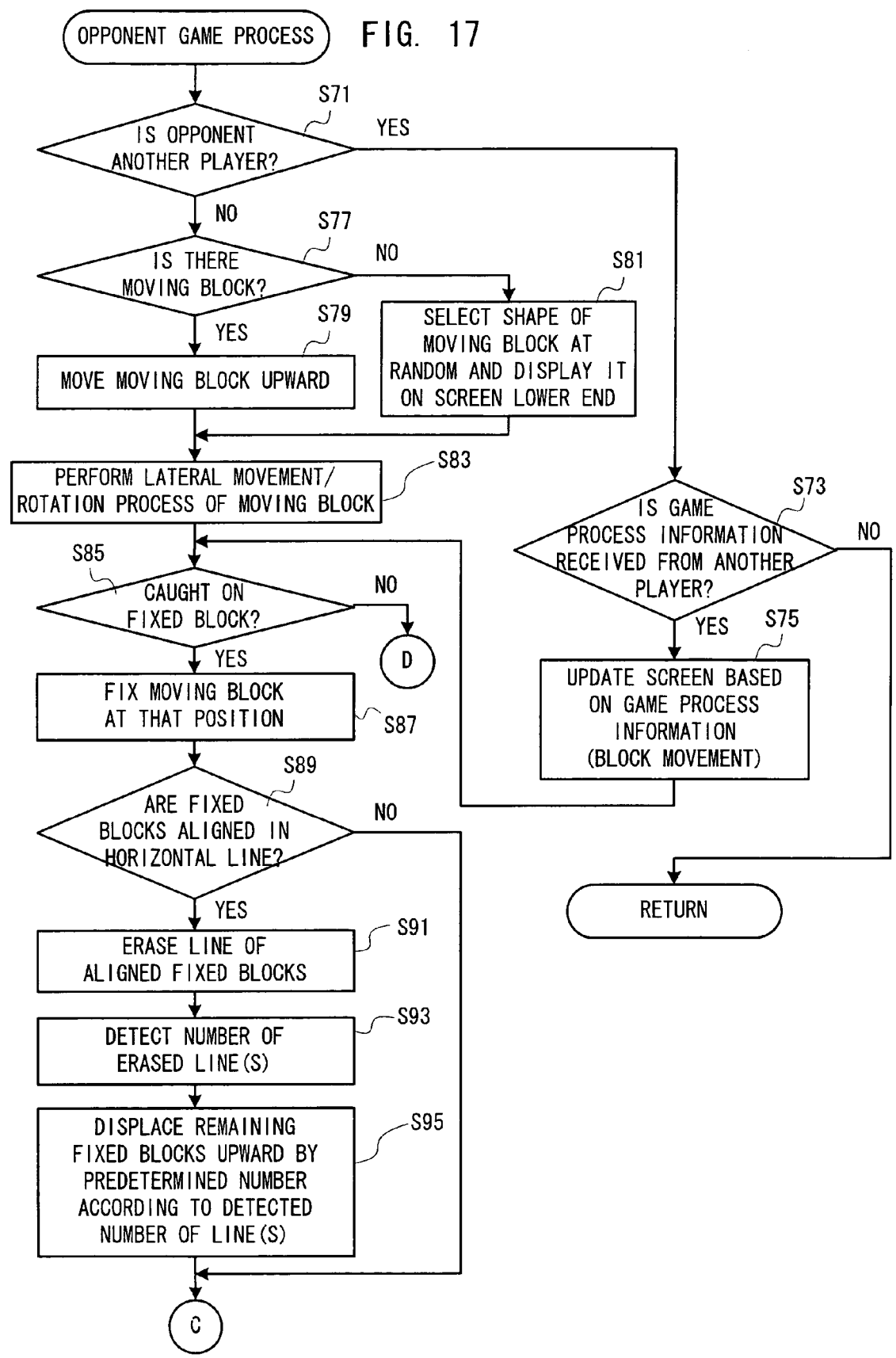
FIG. 17 is a flowchart showing further another part of operation of the CPU core applied to FIG. 1 embodiment.

Referring to FIG. 17, the CPU core 42 determines in a step S71 whether the opponent is the other player or not. If YES here, the CPU core 42 further determines in a step S73 whether or not game process information is received from the other player's game machine. If NO here, the CPU core 42 returns to the higher-layer routine. If YES, the CPU core 42 moves to a step S75.

The game process information received by the wireless communication circuit 64 is temporarily stored in the game process information temporary storage area 96 of the RAM 48. In the step S75, the CPU core 42 updates the screen based on the game process information. As a result, the opponent's moving block MBQ moves upward with lateral movement and rotation as shown in FIG. 4 and FIG. 5, for example. After that, the CPU core 42 moves to a step S85.

If NO in the step S71, the CPU core 42 determines whether or not there exists the opponent's moving block MBQ (hereinafter referred to just "moving block") in the game field GF. If YES here, the CPU core 42 moves the moving block upward in a step S79, and then proceeds to a step S83. On the other hand, if NO, the CPU core 42 selects randomly an arbitrary moving block in a step S81, and displays the selected moving block near the lower base Q of the game field GF. Then, the CPU core 42 moves to a step S83.

In the step S83, the CPU core 42 performs a lateral movement/rotation process on the moving block. In a step S85, the CPU core 42 determines whether the moving block has got caught on the fixed block or not, and if NO here, proceeds to a step S105.

If YES in the step S85, the CPU core 42 goes to a step S87 to fix the moving block at that position. If NO here, the CPU core 42 proceeds to a step S97.

If YES in the step S89, the CPU core 42 erase unit block pieces forming the line(s) in a step S91, and detects the number of erased line(s) in a step S93, displaces the remaining fixed blocks upward by the number of stage(s) according to the number of erased line(s), and then moves to the step S97.

Figure 18:
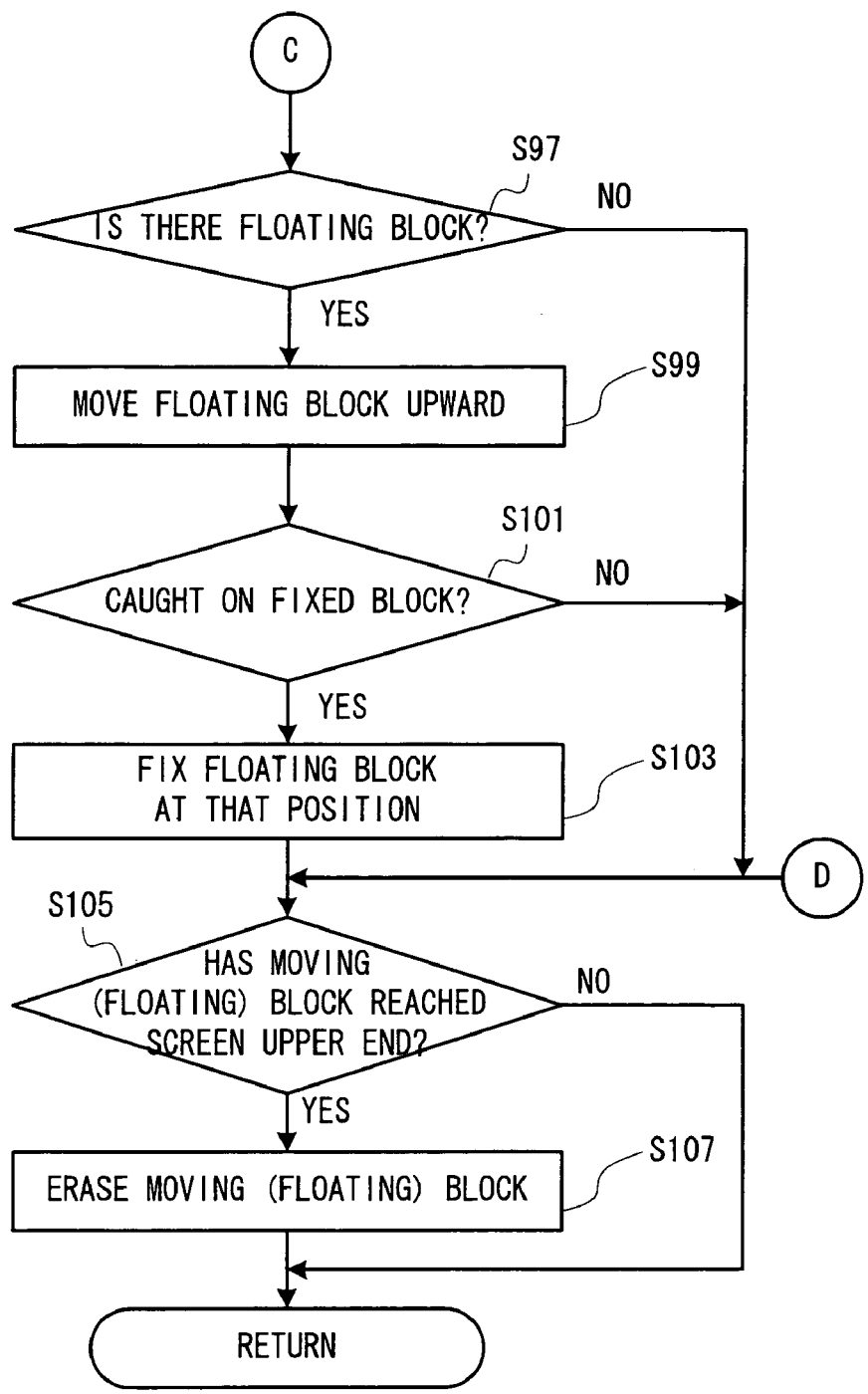
FIG. 18 is a flowchart showing another part of operation of the CPU core applied to FIG. 1 embodiment.
Figure 19:
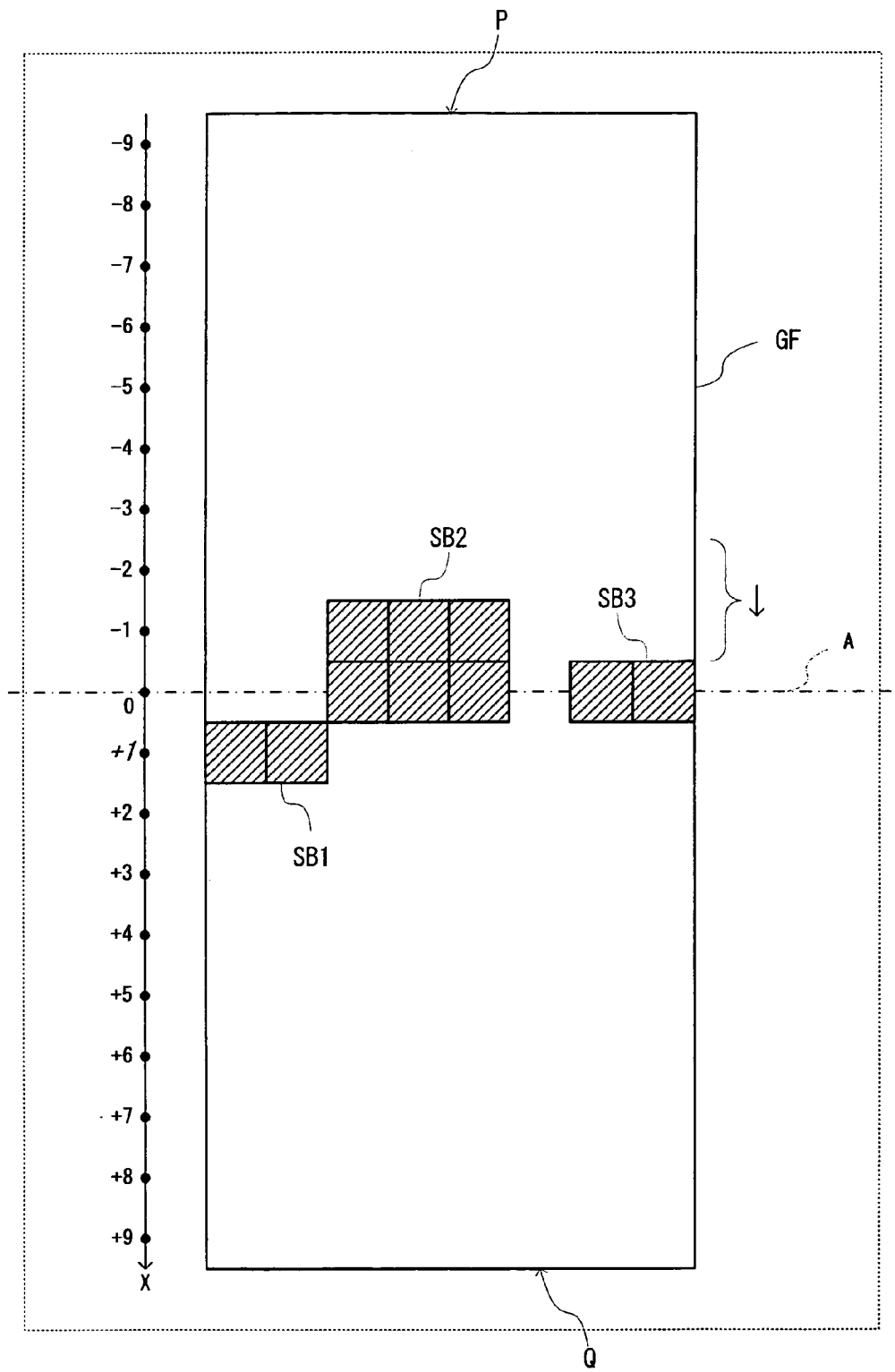
FIG. 19 is an illustrative view showing one example of game screen applied to another embodiment.

Referring to FIG. 18, in the step S97, the CPU core 42 determines the presence or absence of some floating block. If NO here, the CPU core 42 proceeds to a step SI 05. On the other hand, if YES, the CPU core 42 moves the floating block upward in a step S99, and determines in a step S101 whether the floating block has got caught on the fixed block or not. If NO here, the CPU core 42 goes to a step S105. If YES in the step S101, the CPU core 42 moves to a step S103 to fix the floating block at that position.

In the step S105, the CPU core 42 determines whether the moving block or the floating block has reached the upper base P or not. If NO here, the CPU core 42 returns to the higher-layer routine. If YES, the CPU core 42 erases the moving block or the floating block in a step S107, and then returns to the higher-layer routine.

As apparent from the above description, in this embodiment, the CPU core 42 firstly displays one game field GF defined by the upper base P and the lower base Q across the two LCDs 12 and 14 (S1), and displays a fixed block (SB1, SB2, . . . ) in the game field GF (S3). Then, the CPU core 42 executes a player game process using the fixed block in response to the player's input operation, and displaces the fixed block in a direction of moving from the upper base P toward the lower base Q based on the result of the execution (S5). The CPU core 42 also executes an opponent game process and displaces the fixed block in the direction of moving from the lower base Q toward the upper base P based on the result of the execution (S7). Then, the CPU core 42 determines whether the fixed block has reached the upper base P or not (S9), and if the result of determination is affirmative, executes a player defeat process (S13). Moreover, the CPU core 42 determines whether the fixed block has reached the lower base Q or not (S11), and if the result of determination is affirmative, the CPU core 42 executes a player victory process (S15). By the player and the opponent to push the fixed blocks each other in one game field GF as stated above, it is possible to enhance a sense of urgency in the match game.

In this embodiment, the game field GF is displayed astride the two LCDs 12 and 14. Alternatively, it may be displayed only on one of the LCDs 12 and 14 and also displayed on an external display (not shown).

Figure 20:
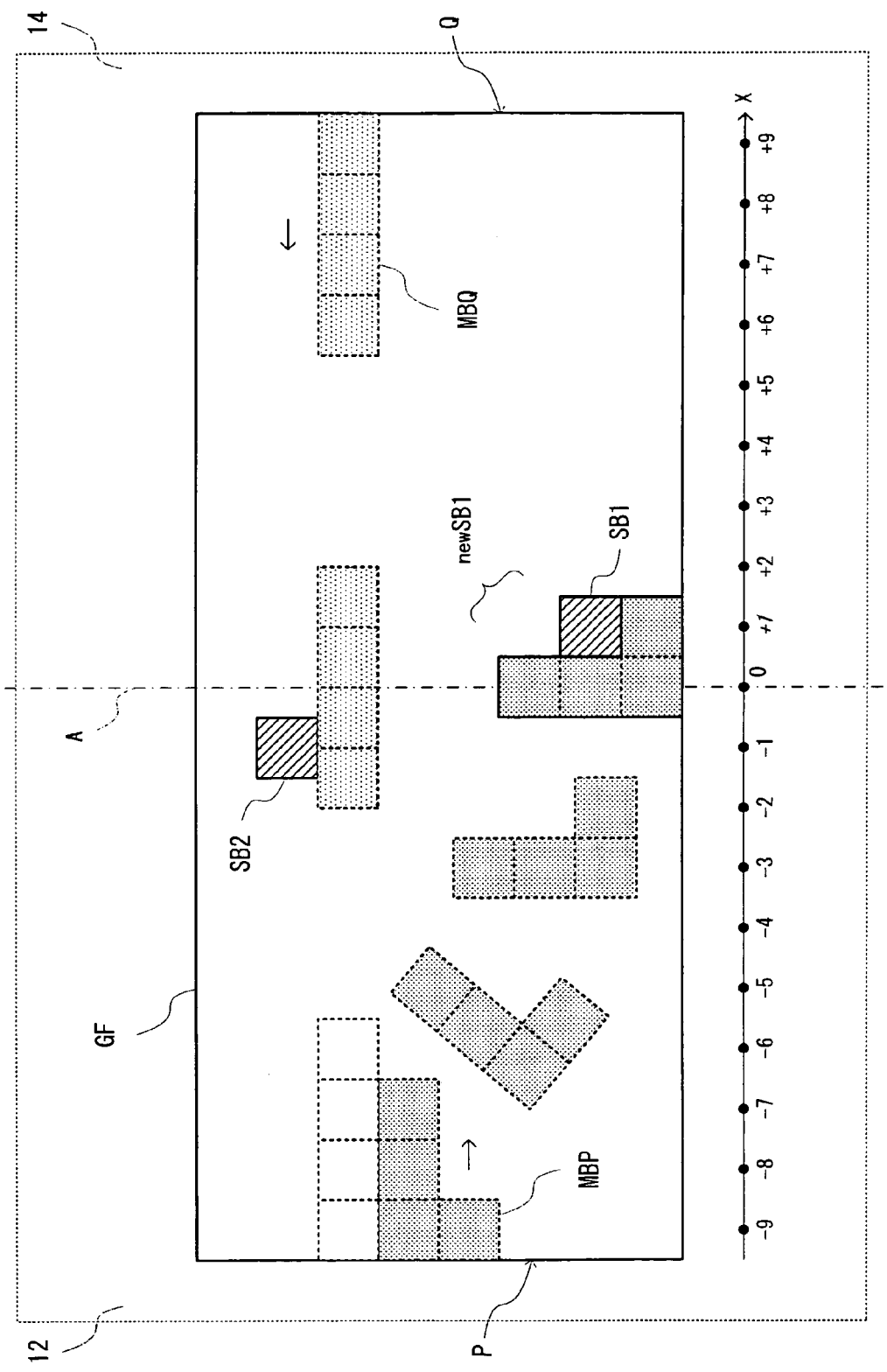
FIG. 20 is an illustrative view showing one example of game screen applied to still another embodiment.

Moreover, an example is given in relation to this embodiment where the player and the opponent advance the game through operation of vertically moving blocks as shown in FIG. 4. As another embodiment, for example, the player and the opponent may play the game through operation of horizontally moving blocks as shown in FIG. 20.

Furthermore, in the case of applying the present invention to a home video game machine or the like having two pairs of operating means, the game can be advanced by the player and the opponent to operate the two pair of operating means individually. More specifically, the CPU core 42 performs a lateral movement/rotation process on a moving block as subject of the player's operation and on a moving block as subject of the opponent's operation, based on the key code entered from the operating means manipulated by the player and the key code entered from the operating means manipulated by the opponent.

The above description is directed to the case in which the present invention is employed in the game apparatus 10 as an example. However, the present invention is applicable to all kinds of computers having a display and operating switches (for example, personal computers, mobile phones, PDAs, digital television sets, etc.).

Although the present invention has been described and illustrative in detail, it is clearly understood that the same is by way of illustration and example only and is not to be taken by way of limitation, the spirit and scope of the present invention being limited only by the terms of the appended claims.

What is claimed is:

1. A storage medium storing a match game program executed by a processor of a computer having an acceptance means for accepting an input operation, wherein the match game program comprises:

a field display step of displaying a game field defined by a first side and a second side;

a fixed block display step of displaying in the game field a fixed block composed of one or more unit block pieces;

a player process step of, in response to an input operation accepted by the acceptance means, executing a player game process using the fixed block and displacing the fixed blocks in a first direction of moving from the first side toward the second side based on execution result of the player game process;

an opponent process step of executing an opponent game process using the fixed block and displacing the fixed block in a second direction of moving from the second side toward the first side based on execution result of the opponent game process;

a first reach determination step of determining whether or not the fixed block has reached the first side;

a defeat process step of executing a player defeat process when it is determined in the first reach determination step that the fixed block has reached the first side;

a second reach determination step of determining whether or not the fixed block has reached the second side; and a victory process step of executing a player victory process when it is determined in the second reach determination step that the fixed block has reached the second side.

2. A storage medium storing a match game program according to claim 1, wherein the computer further has a receive means for receiving a signal, and in the opponent process step, the opponent game process is executed on the basis of the signal received by the receive means.

3. A storage medium storing a match game program according to claim 1, wherein the first side and the second side are individually parallel to a predetermined axis, the player process step includes:
  a first moving block display step of displaying in the game field a first moving block composed of one or more unit block pieces and moving in the first direction;
  a first control step of, in response to the input operation accepted by the acceptance means, subjecting the first moving block to motion control process including a process of movement along the axis;
  a first adhesion determination step of determining whether or not the first moving block has adhered to the fixed block;
  a first alignment determination step of, when it is determined in the first adhesion determination step that the first moving block has adhered to the fixed block, determining whether or not unit block pieces of a new fixed block composed of the fixed block and the first moving block are aligned along the axis with no space between them;
  a first erase step of, when it is determined in the first alignment determination step that the unit block pieces are aligned with no space between them, erasing a line of the unit block pieces aligning along the axis with no space between them;
  a first displacement step of displacing a fixed block derived from the erase in the first erase step, by an amount in accordance with the number of block line(s) erased in the first erase step;

the opponent process step includes:
  a second moving block display step of displaying in the game field a second moving block composed of one or more unit block pieces and moving in the second direction;
  a second control step of subjecting the second moving block to the motion control process;
  a second adhesion determination step of determining whether or not the second moving block has adhered to the fixed block;
  a second alignment determination step of, when it is determined in the first adhesion determination step that the second moving block has adhered to the fixed block, determining whether or not unit block pieces of a new fixed block composed of the fixed block and the second moving block are aligned along the axis with no space between them;
  a second erase step of, when it is determined in the second alignment determination step that the unit block pieces are aligned with no space between them, erasing a line of the unit block pieces aligning along the axis with no space between them;
  a second displacement step of displacing a fixed block derived from the erase in the second erase step, by an amount in accordance with the number of block line(s) erased in the second erase step.

4. A storage medium storing a match game program according to claim 3, wherein the first moving block and the second moving block have individually an asymmetric shape, and the motion control process further includes a rotation process.

5. A storage medium storing a match game program according to claim 3, wherein the player process step further includes a third reach determination step of determining whether or not the first moving block has reached the second side and a third erase step of, when it is determined in the third reach determination step that the first moving block has reached the second side, erasing the first moving block, and the opponent process step further includes a fourth reach determination step of determining whether or not the second moving block has reached the first side, and a fourth erase step of, when it is determined in the fourth reach determination step that the second moving block has reached the first side, erasing the second moving block.

6. A storage medium storing a match game program according to claim 5, wherein the player process step further includes a first float step of moving in the first direction a floating block derived from the erase in the first erase step, and a second float step of moving in the second direction a floating block derived from the erase in the second erase step, and in the third reach determination step, it is further determined whether or not a floating block has reached the second side, in the third erase step, when it is determined in the third reach determination step that the floating block has reached the second side, the floating block is further erased, in the fourth reach determination step, it is further determined whether or not a floating block has reached the first side, and in the fourth erase step, when it is determined in the fourth reach determination step that the floating block has reached the first side, the floating block is further erased.

7. A match game apparatus, comprising:
a field display means for displaying a game field defined by a first side and a second side;
a fixed block display means for displaying in the game field a fixed block composed of one or more unit block pieces;
an acceptance means for accepting an input operation;
a player process means for, in response to the input operation accepted by the acceptance means, executing a player game process using the fixed block and displacing the fixed blocks in a first direction of moving from the first side toward the second side based on execution result of the player game process;
an opponent process means for executing an opponent game process using the fixed block and displacing the fixed block in a second direction of moving from the second side toward the first side based on execution result of the opponent game process;
a first reach determination means for determining whether or not the fixed block has reached the first side;
a defeat process means for executing a player defeat process when it is determined by the first reach determination means that the fixed block has reached the first side;
a second reach determination means for determining whether or not the fixed block has reached the second side; and
a victory process means for executing a player victory process when it is determined by the second reach determination means that the fixed block has reached the second side.

* * * * *